(12) United States Patent  (10) Patent No.: US 7,575,012 B2
Miki et al.  (45) Date of Patent: Aug. 18, 2009

(54) GAS SUPPLY APPARATUS

(75) Inventors: Yoshiyuki Miki, Toyota (JP); Kazunari Shirai, Aichi-ken (JP); Atsufumi Kimura, Toyota (JP); Naohiro Yoshida, Nisshin (JP); Osamu Yumita, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 502 days.

(21) Appl. No.: 11/337,579

(22) Filed: Jan. 24, 2006

(65) Prior Publication Data

US 2006/0246177 A1   Nov. 2, 2006

Related U.S. Application Data

(63) Continuation of application No. PCT/JP2004/010579, filed on Jul. 16, 2004.

(30) Foreign Application Priority Data

Jul. 25, 2003   (JP)   ............... 2003-201509
Jan. 30, 2004   (JP)   ............... 2004-023985

(51) Int. Cl.
G05D 7/06   (2006.01)
G05D 23/19  (2006.01)

(52) U.S. Cl. .................. 137/1; 137/112; 236/61; 236/92 R

(58) Field of Classification Search ............... 137/112, 137/113, 468, 487.5, 255–267, 1; 220/201; 222/54; 236/34.5, 61, 92 R; 429/24; 62/49.1, 62/53.2

See application file for complete search history.

(56) References Cited

U.S. PATENT DOCUMENTS 1,766,858 A * 6/1930 Vincent ............... 236/34.5
4,527,600 A * 7/1985 Fisher et al. ............ 222/54
4,606,497 A * 8/1986 Heimovics, Jr. ........ 236/92 R

FOREIGN PATENT DOCUMENTS

| JP | A 8-115731    | 5/1996  |
| JP | A 2001-295996 | 10/2001 |
| JP | A 2002-181295 | 6/2002  |
| JP | A 2003-28394  | 1/2003  |
| JP | A 2004-84808  | 3/2004  |

OTHER PUBLICATIONS

Honda Service Manual V65 Sabre-VF1100s '84–'85, Honda Motor Co, Oct. 1986, pp. 6-0 and 21-15.*

* cited by examiner

*Primary Examiner*—Stephen Hepperle
(74) *Attorney, Agent, or Firm*—Oliff & Berridge, PLC

(57) ABSTRACT

A gas supply apparatus including: a tank unit that includes a tank storing a gas and a discharge mechanism discharging the stored gas to the outside of the tank at a reduced pressure of the stored gas; a temperature detector that detects a temperature of the tank; and a supply regulator that regulates supply of the gas from the tank according to the detected tank temperature.

33 Claims, 17 Drawing Sheets

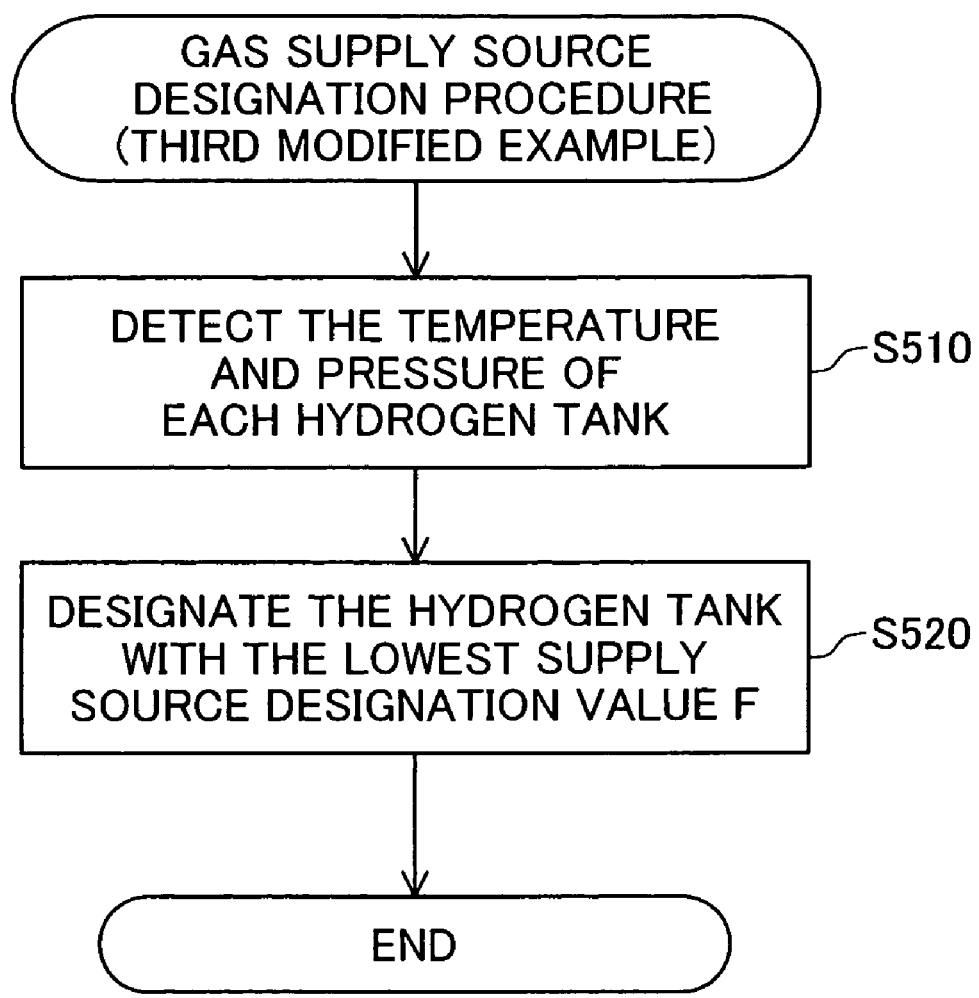

GAS SUPPLY APPARATUS

This is a Continuation of application Ser. No. PCT/JP2004/010579 filed Jul. 16, 2004, which claims the benefit of Japanese Patent Application No. 2003-201509 filed Jul. 25, 2003 and Japanese Patent Application No. 2004-023985 filed Jan. 30, 2004. The entire disclosures of the prior applications are hereby incorporated by reference herein in their entirety.

BACKGROUND

1. Technical Field

The present invention relates to gas supply devices for providing to the outside gas stored in a tank.

2. Related Art

Devices for supply hydrogen gas to fuel cell, which use hydrogen gas as fuel, have been known as gas supply devices that supply to the outside gas that is stored in a tank.

JP-A-2001-295996 and JP-A-8-115731 disclose gas supply devices that supply hydrogen gas that is stored in a plurality of tanks using a hydrogen-occluding alloy.

JP-A-2002-181295 discloses a gas supply device that supplies hydrogen from within a tank for storing high-pressure hydrogen.

When a gas stored in a tank is supplied, the temperatures of the tank-related components such as the tank main unit, regulators, valves and the like fall due to the adiabatic expansion of the gas supplied from the tank. There is a problem in that excessive reductions in temperature of the tank-related parts from the room temperatures of those parts reduce the useful life of those parts.

SUMMARY

Based on the problem described above, the object of the invention is to provide a gas supply device capable of controlling (or reducing, etc.) damage due to reductions in temperature accompanying the gas supply.

In order to solve the problem described above, a gas supply device according to an aspect of the invention comprises: a tank unit that includes a tank storing a gas and a discharge mechanism discharging the stored gas to the outside of the tank while a pressure of the discharged gas are reduced; a temperature detector that detects a temperature of the tank; and a supply regulator that regulates supply of the gas from the tank according to the detected tank temperature. The gas supply device according to the invention enables the control of damage resulting from reductions in temperature accompanying gas supply, doing so through reducing the gas supply depending on the tank temperature.

The gas supply device according to the invention, having the structure described above, can also use the form described below. A plurality of the tanks may be provided, where the temperature detector detects the temperatures of the plurality of tank, and the supply limiter unit may limit the supply of gas so as to reduce the temperature differential between the plurality of tanks, based on the detected tank temperatures. Doing so can achieve a standardization of the temperatures between the plurality of tanks, which can suppress damage caused by the reductions in temperature that accompany gas supply.

In this case, the supply regulator may limit the supply of gas so as to reduce the temperature differences between the plurality of tanks through switching the supply source from one tank to another different tank when the temperature has dropped by a specific amount from the temperature at the point in time wherein the tank was switched to be the supply source. Moreover, the supply regulator may limit the supply of gas so as to reduce the temperature differences between the plurality of tanks through switching the supply source to the other tank when a specific temperature differential has been reached between the temperature of the tank that has become the gas supply source and the temperature of the other tank that is different from the tank. Moreover, the tank that is switched to be the source supply by the supply regulator may be the tank, of the plurality of tanks, that has the highest temperature.

Furthermore, pressure detectors may be provided for detecting the pressures within the plurality of tanks, and the supply regulators may limit the supply of gas so as to reduce the temperature differences and the pressure differences between the plurality of tanks based on the detected temperatures and pressures of the plurality of tanks. Doing so enables the prevention of a drop in the frequency of use of any tanks, among the plurality of tanks, that tend to have a low temperature due to factors in the installation environment.

The supply regulator may adjust the supply of gas from a tank based on a relationship between the detected tank temperature and a guaranteed temperature range for guaranteeing the performance of the tank. Doing so enables the suppression of temperature decreases in tanks accompanying gas supply, through reducing the amount of gas supplied through adjusting the gas supply based on the relationship between the tank temperature and the guaranteed temperature range of the tank.

In this case, the supply regulator may adjust the supply of gas from the tank so that the detected tank temperature does not deviate from the guaranteed temperature range for which the performance of the tank is guaranteed. Doing so enables the suppression of excessive drops in tank temperature.

Moreover, a plurality of the tanks may be provided, and, from among the plurality of tanks, the temperature detector may detect the temperature of at least the tank that has become the supply source for the gas, where the supply regulator may limit the supply of gas from the tank that has become the supply source, doing so based on the relationship between the detected temperature of the tank that has become the supply source and the guaranteed temperature range for which performance of the tank is guaranteed. Doing so enables control (or reduction, etc.) of damage resulting from reductions in temperature accompanying gas supply, even when a plurality of tanks is provided. Here "limiting the supply of gas" includes not only the case wherein the gas supply is cut off, but also the case wherein the amount of gas supplied is reduced.

Here, the supply regulator may limit the supply of gas from the tank that has become the supply source so that the detected temperature of the tank that has become the supply source does not deviate from the guaranteed temperature range for which the performance of the tank is guaranteed. Doing so enables the control of excessive drops in tank temperature, even when a plurality of tanks is provided.

The supply regulator may limit the supply of gas from the tank that has become the supply source when the detected temperature of the tank that has become the supply source has dropped by a specific amount, within the guaranteed temperature range, since the tank became the supply source, and the temperature detector may detect the temperatures of the plurality of tanks, and the supply regulator may limit the supply of gas from the tank that has become the supply source when a specific temperature differential, within the guaranteed temperature range, has been reached between the detected temperature of the tank that has become the supply source, and the temperature of another tank that is different from the tank.

Doing so enables the achievement of standardization of temperatures between the various tanks. Moreover, a pressure detector for detecting the pressures of the plurality of tanks may be provided, and the supply regulator may limit the supply of gas from the tank that has become the supply source when the specific temperature differential has been reached or when a specific pressure differential between the detected pressure of the tank that has become the supply source and the pressure of another tank that is different from the tank. Doing so enables the equalization of temperatures and pressures between the various tanks.

The supply regulator may comprise a tank selection means that selects the tank to become the supply source from among the other tanks that are different from the tank that is the supply source, when limiting the supply of the gas. Doing so allows the supply of gas to occur continuously.

The invention includes control so as to use the various tanks intermittently, in the various forms described below. For example, when n tanks are provided, control that uses the plurality of tanks in a specific sequence repetitively, such as "first tank→second tank . . . →nth tank→first tank→second tank . . . " is included in the invention. It is not necessary for the order in which the tanks are used to be fixed, but rather the tank to be used next may be selected at the point in time at which it is judged necessary to switch the supply source. In other words, the situation wherein the tanks are used in an irregular or unspecified order, such as "first tank→second tank→first tank→third tank→ . . . " is included in control according to the invention. In this case, the selection criteria for the tank to be used next may be set based on, for example, the temperatures of the tanks, the amounts of gas remaining in the tanks, a predetermined sequence, and so forth.

The tank selecting means may be means for selecting, as the supply source, one tank at a time from among the plurality of tanks. In the invention, a plurality of tanks, such as two tanks, three tanks, etc., may be selected together as the supply source, but when a plurality of tanks are provided, normally the supply pressures after the pressures have been reduced will vary from tank to tank. Based on this variability, when gas is supplied simultaneously from a plurality of tanks, there may be a tendency to use predominantly the tank with the higher supply pressure, causing the amounts of supply from each of the tanks, and the temperature drops due to expansion, to be uneven. The effects of this unevenness can be avoided by selecting, as the supply source, one of the tanks, which can simplify the control processing for switching the tanks, and can stabilize the gas supply. When a plurality of tanks are selected as the supply source together, the amounts of gas supplied from each of the tanks should be adjusted so as to cause the supply pressures of each to be equal, to the degree that there will be no unevenness in the amounts of supply.

The supply regulator may be means for selecting a tank to become the supply source based on the use history as the supply sources of the plurality of tanks. Doing so enables an equalization of use frequency among the plurality of tanks. Moreover, the temperature detector may detect the temperatures of the plurality of tanks, and the selecting means may be means for selecting a tank, as the supply source, based on the detected temperatures of the plurality of tanks. Doing so enables the selection of a tank, from the temperature status of the tanks, suitable for the next supply tank.

The supply regulator may comprise failure detecting means for detecting whether or not there is a failure in the supply of gas from a tank that is the supply source, and failure selecting means for selecting a tank to be the supply source, from among the other tanks, when a failure is detected in the tank that is the supply source. Doing so enables a stabilized supply of gas to be insured. The failure in the gas supply can be detected, for example, based on the behavior of the pressure in a supply tube.

With a supply tube for supplying the gas connected in common with each of the discharge mechanisms of the plurality of tanks, a supply tube detecting part for detecting the pressure in the supply tube, and a supply tube monitoring part for monitoring whether or not there is an aberration in at least one of the discharge mechanisms, based on the behavior of the detected supply tube pressure, may be provided. For example, an aberration may be detected in the discharge mechanism closing function if there is a drop in the supply tube pressure even through all of the tank discharge mechanisms are closed. Conversely, an aberration in the discharge mechanism opening function may be detected if there is no increase in the pressure of the supply tube when a tank discharge mechanism is open.

The temperature detector may detect the temperature of a tank based on a physical quantity regarding gas that is supplied form the tank. Doing so enables the detection of the temperature of a tank from fluctuations in gas volume and fluctuations in pressure. Note that the physical quantity related to the gas that is supplied from the tank may be a physical quantity related to the gas after discharging from inside of the tank, and may be a physical quantity related to the gas that is stored within the tank prior to discharge from within the tank.

The temperature detector may detect the temperature of the tank based on the degree of adiabatic expansion of the gas supplied from the tank. Doing so enables the detection of the temperature of the tank through estimating the amount of drop in tank temperature.

The temperature detector may detect the temperature of the tank based on the amount of heat removed from the tank by the gas that is supplied from the tank. Doing so enables the temperature of the tank to be detected from the amount of heat removed from the gas.

The temperature in at least a part of the tanks and the discharge mechanisms may be detected as the tank temperature. Doing so enables the tank temperature to be detected directly.

The temperature detector may detect the temperature of the tank based on the supply volume of the gas supplied from the tank. Doing so enables the temperature of the tank to be detected from the supply volume of the gas that has a correlation to the tank temperature. The amount of heat removed by the gas from a tank and the change in temperature of the tank are correlated with the amount of gas supplied from the respective tank. The amount of gas supplied is correlated with the pressure within a tank, and thus the pressure can be used as a parameter. Using the pressure as a parameter has the benefit of being able to eliminate the temperature sensor.

A heating part may be provided for heating the tank. Doing so enables the speed of the drop in temperature of the tank during the supply of gas to be reduced, enabling a reduction in the frequency with which tanks are switched. Furthermore, this enables a hastening of the recovery of the temperature of a tank wherein the supply of gas has been halted. For a tank from which the supply of gas has been halted, the next selection as the supply source cannot be made until the temperature has adequately recovered, and thus expediting the temperature recovery makes it possible to insure stability in being able to use a tank as a supply source, and enables the gas to be stabilized and supplied.

A warning part may be provided to provide a warning of a fault when there is a fault in the supply of gas from the tank. The fault warning may use a variety of forms. For example, the tank wherein there is the fault may be cut off and the total amount of gas may be calculated to correct the display of a remaining quantity indicator. Doing so enables a manager to know of the fault, because the quantity of remaining gas will drop rapidly. In another form, a low gas warning lamp may be illuminated or may be caused to flash, regardless of the total quantity remaining. In yet another form, a warning display for providing a warning as to whether or not there is a fault, for each of the tanks, may be provided. The fault warning may be performed audibly, regardless of the display.

The invention can be applied to a variety of gas supply devices. For example, the configuration may be that of a gas supply device wherein the gas is a fuel gas for a fuel cell, including hydrogen, and the gas supply destination being a fuel cell that uses hydrogen as the fuel. The various characteristics described above need not necessarily all be provided, but rather a portion thereof may be omitted or combined as appropriate. The invention may be configured as a stationary device, or may be configured as a device that is mounted on a vehicle or another moving body. The invention is not limited to a form as a gas supply device as described above, but rather may be configured in a variety of forms, such as a method of controlling a gas supply device.

BRIEF DESCRIPTION OF THE DRAWINGS

FIG. 17 is a flow chart illustrating a third modified embodiment of a procedure for gas supply source designation.

DESCRIPTION OF THE PREFERRED EMBODIMENTS

Gas supply devices to which the invention is applied will be explained in the following order in order to more fully explain the configurations and effects of the invention, as described above.

A. First Embodiment

Figure 1:
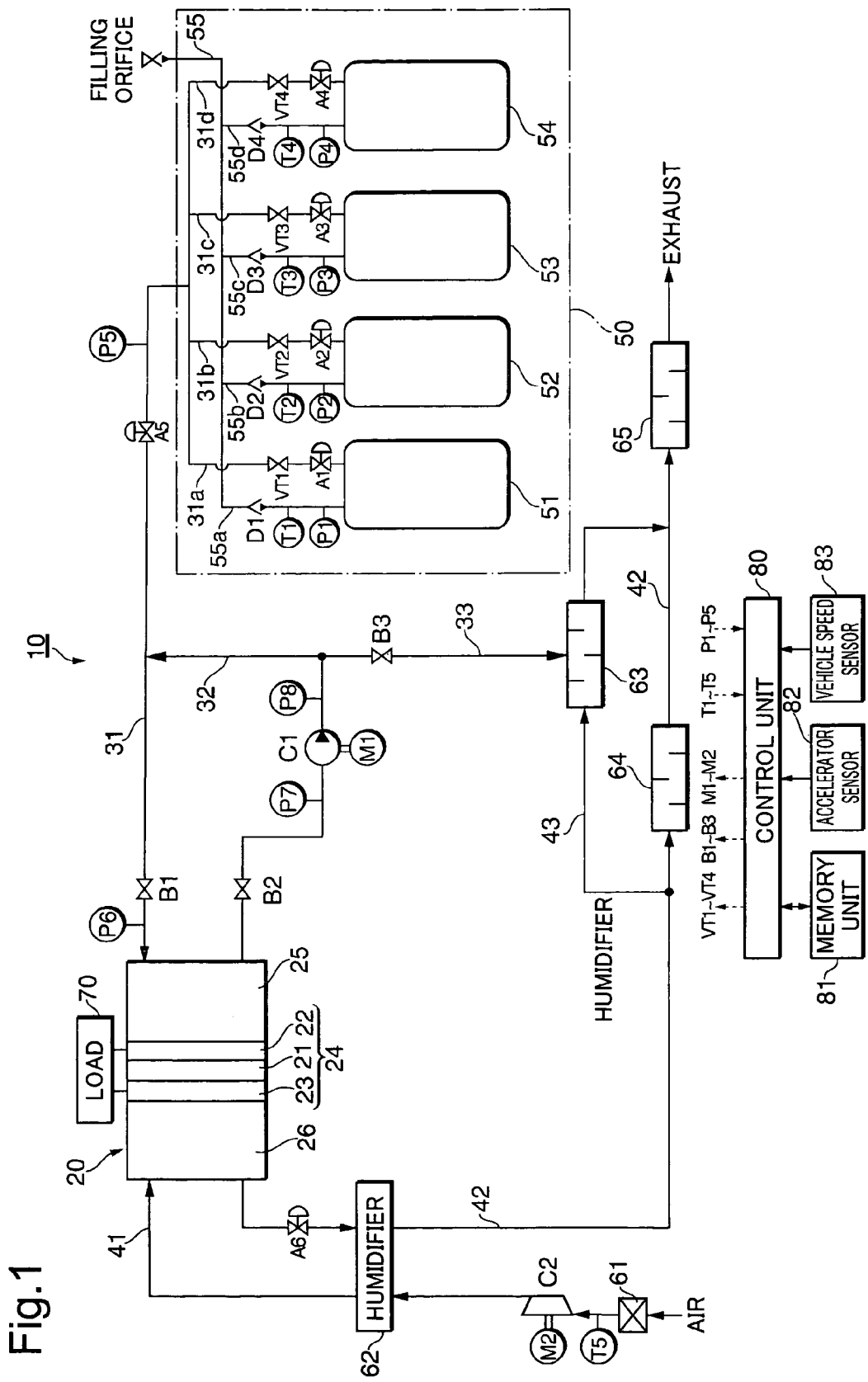
FIG. 1 is an explanatory diagram illustrating a fuel cell system 10 in a first embodiment.
Figure 2:
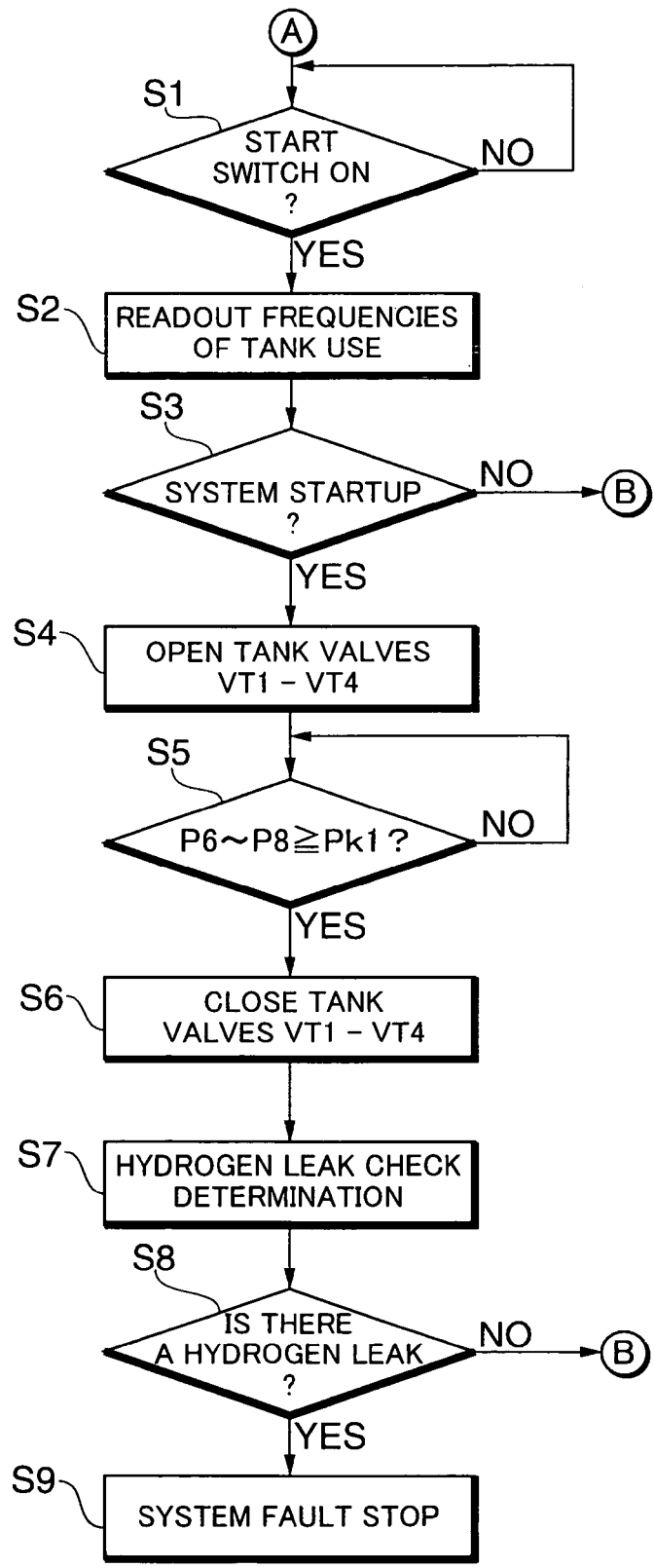
FIG. 2 is a flow chart illustrating a control procedure for a control unit 80.
Figure 3:
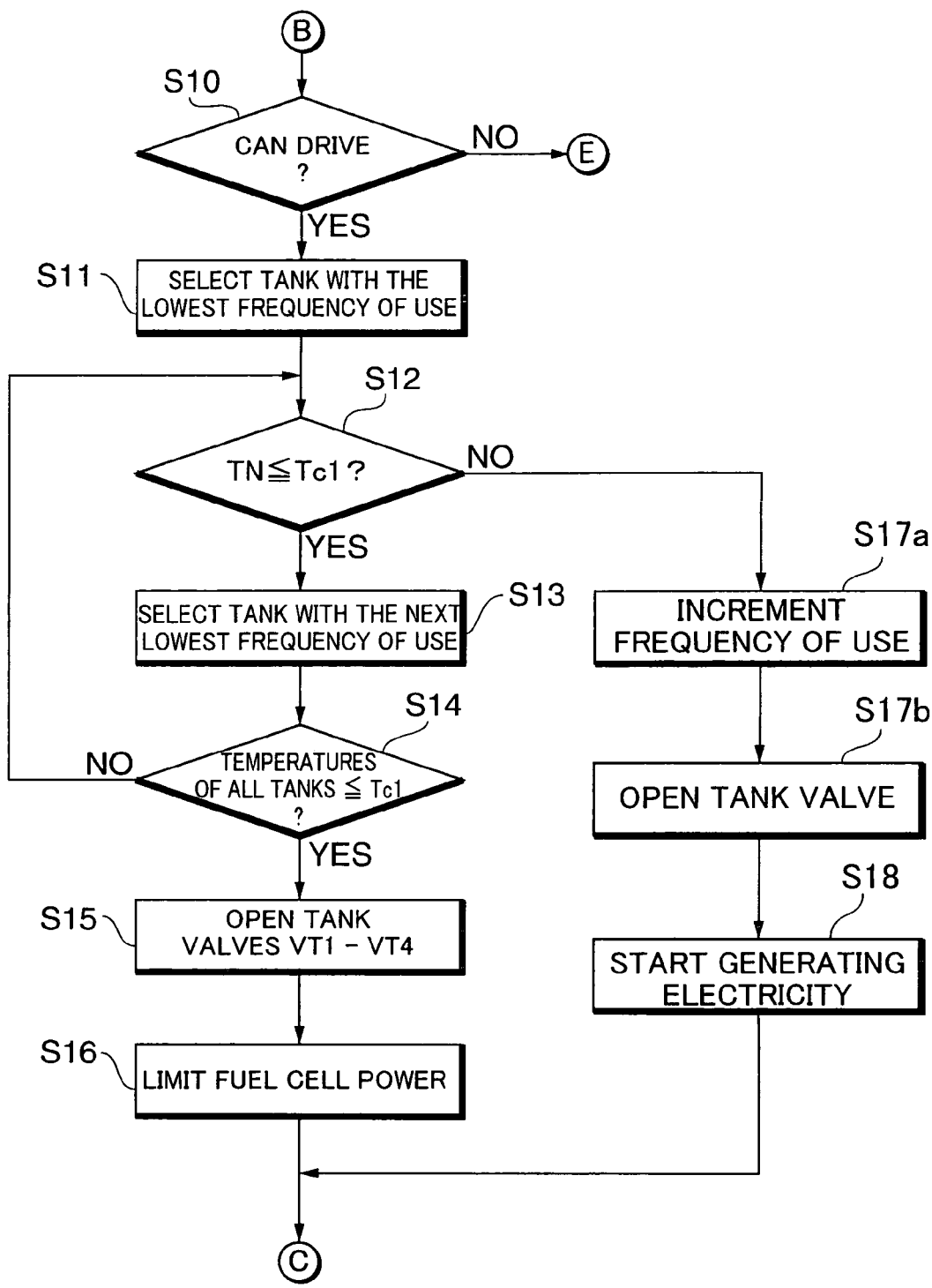
FIG. 3 is a flow chart illustrating a control procedure for a control unit 80.
Figure 4:
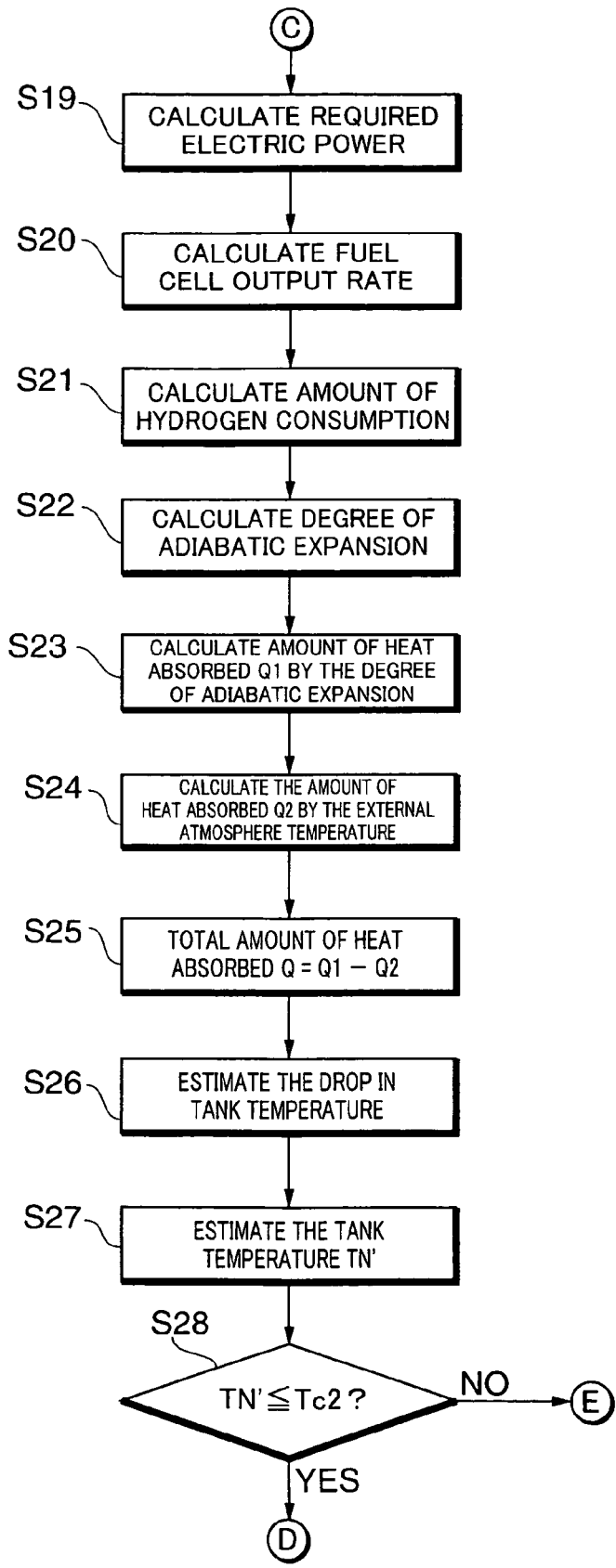
FIG. 4 is a flow chart illustrating a control procedure for a control unit 80.
Figure 5:
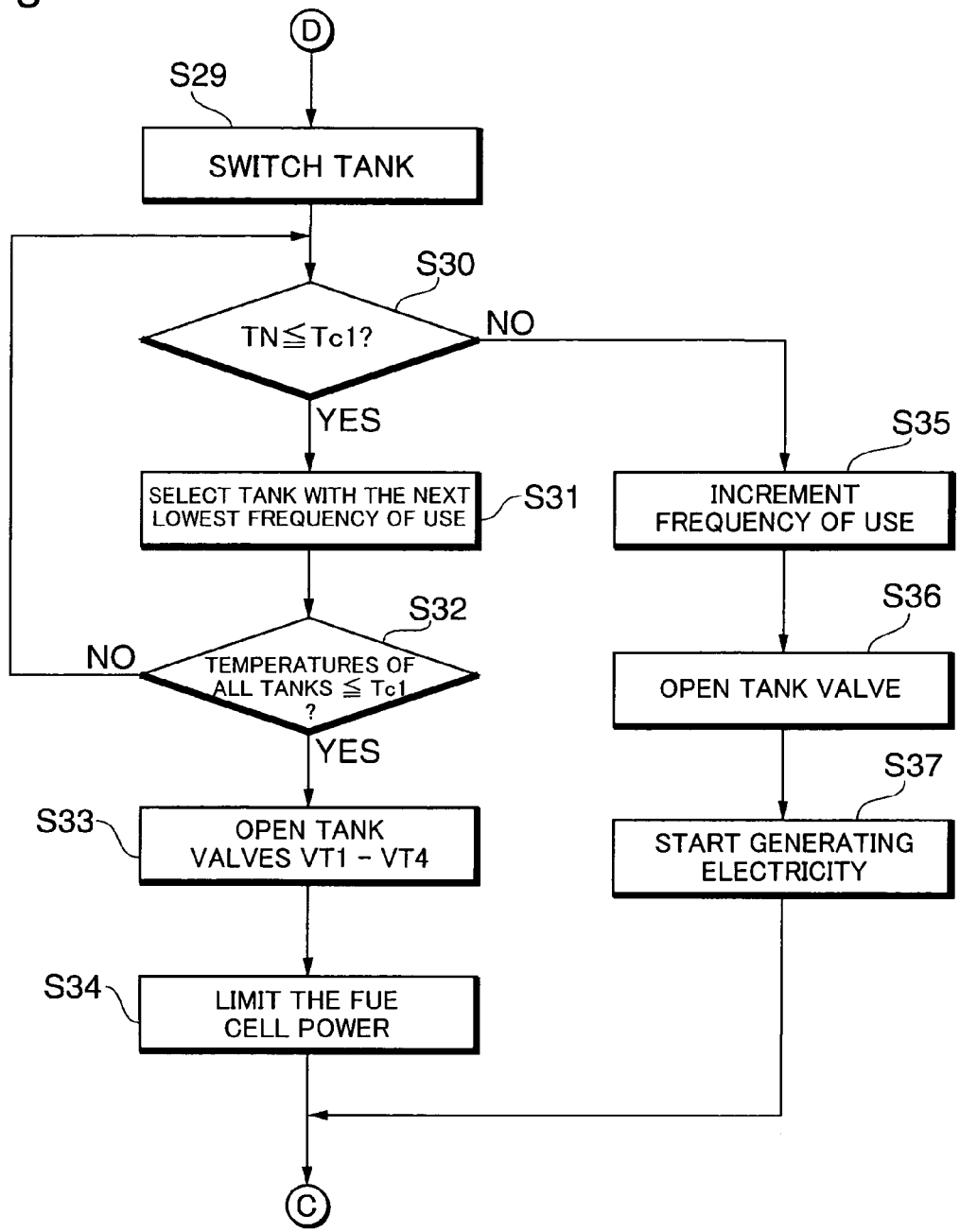
FIG. 5 is a flow chart illustrating a control procedure for a control unit 80.
Figure 6:
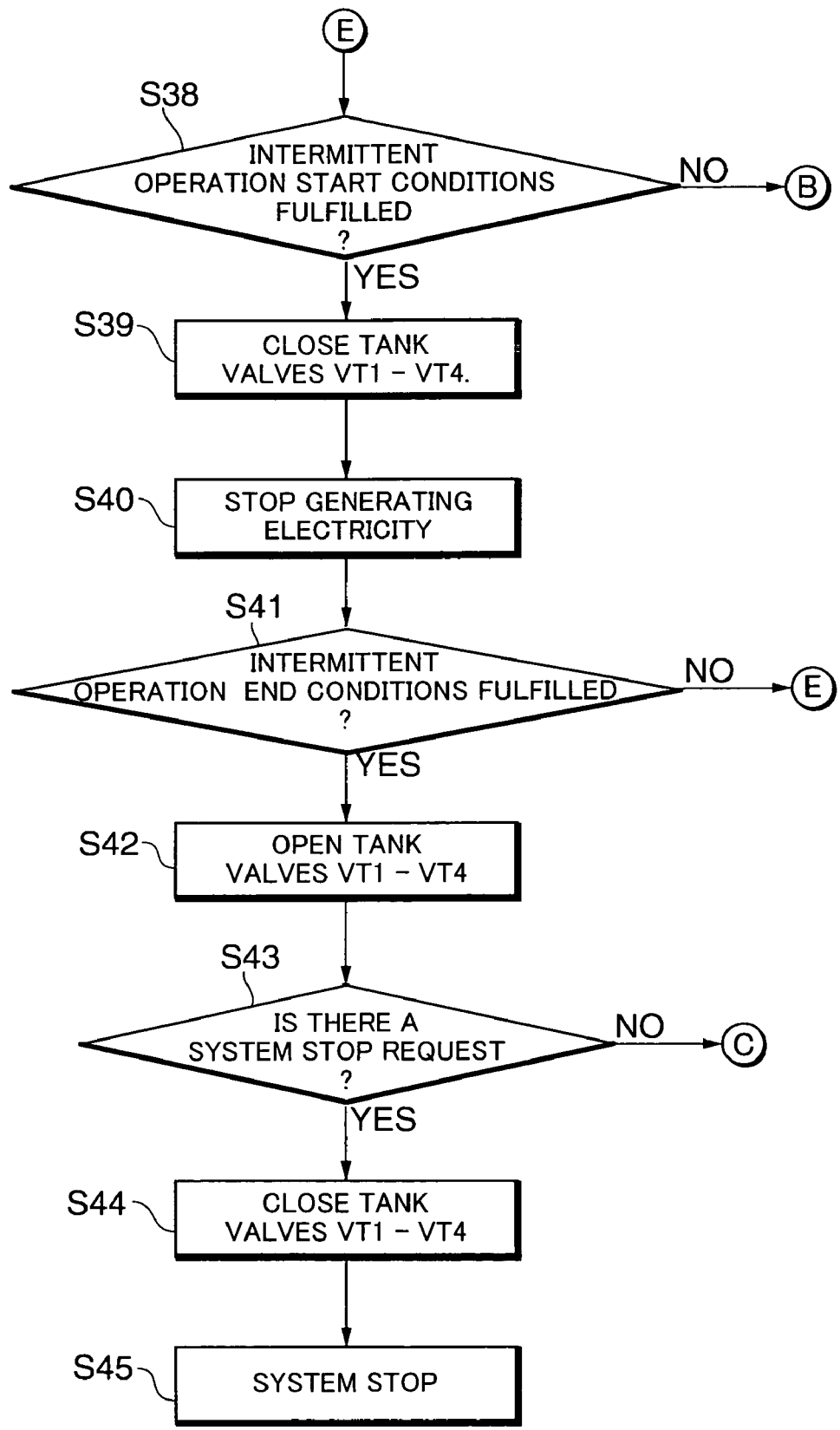
FIG. 6 is a flow chart illustrating a control procedure for a control unit 80.

A-(1). Configuration of a Fuel Cell System 10
A-(2). Operation of the Fuel Cell System 10
A-(3). Other Forms of Embodiment B. Second Embodiment B-(1). System Configuration
B-(2). Procedure for Monitoring at Startup
B-(3). Gas Supply Control
B-(3-1). Procedure for Designating Gas Supply Source
B-(3-2). Procedure for Fault Warnings
B-(3-3). Procedure for Heating
B-(4). Effects
B-(5). Modified Forms of the Procedure for Designating the Gas Supply Source
B-(6). Other Forms of Embodiment A. First Embodiment A-(1). Configuration of a Fuel Cell System 10:
FIG. 1 is an explanatory diagram illustrating a fuel cell system 10 according to a first embodiment. In FIG. 1, the fuel cell system 10 is shown focusing on a hydrogen supply system. The fuel cell system 10 is structured as an on-board electrical generator for generating electricity, mounted on a fuel cell electric vehicle (FCEV), where a fuel cell 20 that receives a supply of reactive gases (a fuel gas and an oxidizing gas) are received and electricity is generated. The fuel cell 20 is a membrane/electrode assembly (MEA) provided with an anode 22 on one surface of a polymer electrolytic layer 21, made from, for example, an ion exchange membrane that has proton conductivity, made from a fluorinated resin, and a cathode 23 formed by, for example, screen printing, on the other surface thereof. Both sides of the membrane/electrode assembly 24 are interposed between ribbed separators (not shown), where channel-shaped anode gas channels 25 and cathode gas channels 26 are formed between these separators and the anode 22 and cathode 23, respectively. The electrical power generated by the fuel cell 20 is supplied to a load 70. Here, for convenience in explanation, the structure of a single cell comprising the membrane/electrode assembly 24, the anode gas channels 25 and the cathode gas channels 26 is shown schematically, but in practice a stacked structure wherein a plurality of these single cells are connected in series, separated by the ribbed separators described above, is provided.

A hydrogen supply device 50 carries four hydrogen tanks 51, 52, 53, and 54 that supply hydrogen (the fuel gas) to the fuel cell 20. The hydrogen supply device 50 performs the hydrogen supply from one of the hydrogen tanks, of this plurality of hydrogen tanks 51 through 54, that is selected as the hydrogen supply source. The hydrogen tanks 51 to 54 are filled to a high pressure (for example, 300 to 700 atmospheres) with compressed hydrogen gas. A filling tube 55 for filling the hydrogen into the individual hydrogen into the individual hydrogen tanks 51 through 54 from a hydrogen supply facility, such as a hydrogen station, is connected to the hydrogen tanks 51 through 54 through a 4-branch split into four branch tubes 55a to 55d. Each of the individual branch tubes 55a to 55d is provided with a check valve D1 to D4 for preventing the reverse flow of hydrogen at the time of hydrogen filling, a pressure sensor P1 to P4 for detecting the pressure within the tank, and a temperature sensor T1 to T4 for detecting the tank temperature. The hydrogen supply tube 31 for supplying hydrogen to the fuel cell 20 from the hydrogen supply device 50 is connected to the hydrogen tanks 51 through 54 through a four-way split into four branch tubes 31a to 31d. The branch tubes 31a through 31d are each equipped with a first-stage regulator (pressure adjusting valve) A1 to A4 for reducing the hydrogen pressure, and a tank valve (electromagnetic shutoff valve) VT1 to VT4 for cutting off the discharge of hydrogen from the hydrogen tanks 51 to 54.

In the hydrogen supply system for the fuel cell system 10 there is a return flow path 32 for returning to the anode gas channel 25 the anode off gas (the hydrogen off gas) that is exhausted from the anode gas channel 25, and a hydrogen supply tube 31, as described above. The hydrogen circulating system is structured from this hydrogen supply tube 31 and the return flow path 32. The hydrogen supply tube 31 is equipped with a second-stage regulator (pressure adjustment valve) A5 for reducing the hydrogen pressure, a pressure sensor P5 for detecting the pressure of the hydrogen that is flowing between the aforementioned first-stage regulators A1 to A4 and the second-stage regulator A5, an electromagnetic shutoff valve B1 for cutting off the supply of hydrogen to the anode intake aperture, and a pressure sensor P6 for detecting the gas pressure at the anode intake aperture. The return flow path 32 is equipped with an electromagnetic shutoff valve B2 for cutting off the anode off gas that is exhausted from the anode outlet aperture, a circulating pump C1 for returning the anode off gas to the hydrogen supply tube 31, and pressure sensors P7 and P8 for detecting the pressures upstream and downstream of the circulating pump C1. The anode off gas, for which there is a loss of pressure when passing through the anode gas channel 25, is pressurized to an appropriate pressure by the circulating pump C1 that is driven by a motor M1, and is fed into the hydrogen supply path 31. In the return flow path 32 the anode off gas flow path 33 is split for purging, to the outside of the system, a portion of the anode off gas from the return flow path 32 when the concentration of non-hydrogen components included in the circular hydrogen is high. The anode off gas purge procedure is structured so as to be adjustable through the opening and closing of an electromagnetic shutoff valve (purge valve) B3 that is equipped in the anode off gas flow path 33.

An oxygen supply system for the fuel cell system 10 includes an oxygen supply path 41 for supplying oxygen (the oxidizing gas) to the cathode gas channel 26, and a cathode off gas flow path 42 for discharging to the outside of the system the cathode off gas (oxygen off gas) that is exhausted from the cathode gas channel 26. Air that is drawn in from the atmosphere through an air filter 61 is compressed by an air compressor C2 that is driven by a motor M2, after which it is humidified as appropriate by a humidifier 62 and is fed into the cathode gas channel 26 through the oxygen supply path 41. In the humidifier 62, moisture exchange is performed between the cathode off gas, which is in a high humidity state due to the water that is produced by the fuel cell reaction of the fuel cell 20, and the oxygen in a low-humidity state that is drawn from the atmosphere. The pressure of the cathode off gas is adjusted by the regulator A6, after which the cathode off gas passes through the humidifier 62 and the cathode off gas flow path 42, and is fed into mufflers 64 and 65. The cathode off gas, after noise attenuation by the mufflers, is exhausted to the outside of the system. In the cathode off gas flow path 42, there is a bypass flow path 43 that branches to a diluter 63 for diluting the anode off gas, and then rejoins the cathode off gas flow path 42. The anode off gas (the gas to be diluted) is introduced into the diluter 63 through the anode off gas flow path 33, and is diluted through mixing with the cathode off gas (the diluting gas) that flows through the bypass flow path 43. Note that the air filter 61 is equipped with a temperature sensor T5 for detecting the outside air temperature.

The control unit (control means) 80 is structured from a CPU for performing system control, drive circuits for controlling the opening and closing of the various electromagnetic valves (VT1 through VT4 and B1 through B3), input/output interfaces for not only receiving inputs of the sensor signals that are outputted from the various sensors (P1 through P5 and T1 through T5) but also outputting control signals to the various electromagnetic valves (VT1 through VT4 and B1 through B3) and supplementary motors (M1 and M2), and so forth. The control unit 80 calculates the required electric power for the load 70, from the vehicle speed detected by a vehicle speed sensor 83 and the degree of accelerator opening that is detected by an accelerator sensor 82, controls the driving of the motors M1 and M2 and of the electromagnetic shutoff valve D3, adjusts the amount of hydrogen and amount of oxygen supplied to the fuel cell 20 and thereby controls the system so as to provide the desired amount of electrical generation. The load 70 is structured so as to be able to have electricity supplied from a secondary battery (not shown) as well as the fuel cell 20. The load 70 includes a traction motor for driving the vehicle, and the supplementary motors, Motors M1, M2, etc., for the fuel cell 20. Moreover, the control unit 80 monitors the temperature statuses of the hydrogen tanks 51 to 54 based on sensor signals that are outputted from the pressure sensors P1 through P5 and the temperature sensors T1 through T5, and controls the opening and closing of the individual tank valves VT1 through VT4 to control the switching of the hydrogen tanks 51 to 54. A memory unit 81 records the history of use of the various hydrogen tanks 51 to 54. The history of use refers to values wherein the states of use of the hydrogen tanks 51 to 54 are evaluated quantitatively. For example, the frequency of use of the hydrogen tanks 51 through 54 (the number of times that the tank valves VT1 through VT4 have been opened), the cumulative time of use of the hydrogen tanks 51 to 54 (the cumulative value for the time over which the tank valves VT1 through VT4 are opened), or can use the product of the cumulative use time and the tank pressure. The history of use is updated sequentially to the newest values each time one of the hydrogen tanks 51 to 54 is used as the hydrogen supply source. The control unit 80 combines, for example, the histories of use and/or the temperature statuses of the hydrogen tanks 51 to 54 to select one of the tanks as the hydrogen supply source. Moreover, when in intermediate drive mode, the control unit 80 not only closes the electromagnetic shutoff valves B1 and B2 to cutoff the hydrogen supply to the fuel cell 20, but also performs system safety checks by detecting hydrogen leaks based on the sensor signals that are outputted from the pressure sensors P6 to P8.

A-(2). Operation of the Fuel Cell System 10:

Next the procedure of selecting and switching the hydrogen tanks to serve as the hydrogen supply sources will be explained in reference to FIG. 2 through FIG. 6. The control routines illustrated in these drawings are performed by the control unit 80. First a check is performed as to whether or not the start switch, which indicates that the system is to be started, is in the ON state (Step S1). This start switch corresponds to the ignition key for a vehicle that carries an internal combustion engine. When the start switch is in the ON state (Step S1: YES), the control unit 80 reads out the hydrogen tank use frequency that is stored in the memory unit 81 (Step S2). Here the frequency of use is an embodiment of the history of use of the hydrogen tank, but the history of use of the hydrogen tank is not limited thereto, but instead may be the cumulative time of use, as described above, or a value that is the product of the cumulative time of use and the tank pressure. Next the control unit 80 performs a check as to whether or not this is a system startup (Step S3).

If this is a system startup (Step S3: YES), then it is necessary to supply and pressurize hydrogen to the hydrogen supply tube 31 and the fuel cell 20. In order to reduce as far as possible the time required for startup, all of the tank valves VT1 through VT4 are opened (Step S4), and when the detected pressures by the pressure sensors P6 through P8 exceed the threshold pressure PK1 (Step S5: YES), all of the tank valves VT1 through VT4 are closed (Step S6) and a hydrogen leak check is performed (Step S7). For this threshold pressure PK1, a pressure value that is necessary and sufficient for performing a hydrogen leak check for the hydrogen supply tube 31 and the return flow path 32 should be selected. In the hydrogen leak check (Step S7), all of the electromagnetic shutoff valves B1 through B3 are closed, and with the valves for the hydrogen supply tube 31 and the return flow path 32 tightly closed, a hydrogen leak is detected by whether or not the drop in pressures detected by the pressure sensors P5 through P8 exceed a specific threshold value. If there is a hydrogen leak (Step S8: YES), a system fault stop is performed (Step S9). On the other hand, if not a system startup (Step S3: NO) or if there is no hydrogen leak (Step S8: NO), the control jumps to Step S10.

In Step 10, a check is performed as to whether or not driving is possible. If driving is not possible (Step S10: NO), then the control jumps to Step S38. If driving is possible (Step S10: YES), then the hydrogen tank, from among the hydrogen tanks 51 to 54, for which the frequency of use is the lowest is selected as the hydrogen supply source (Step S11). When there is a plurality of hydrogen tanks for which the frequency of use is the lowest, then the hydrogen tank with the highest temperature should be selected. Next, a check is performed as to whether or not the temperature TN of the hydrogen tank that is selected as the hydrogen supply source is less than the threshold temperature Tc1 (Step S12). The temperature TN is the tank temperature that is detected by the temperature sensors T1 through T4 for the hydrogen tank 51 to 54 that is selected as the hydrogen supply source. The threshold temperature Tc1 is the temperature that serves as the criterion for switching tanks in order to control the damage to the hydrogen tank due to the drop in tank temperature, and may be set to the neighborhood of the lower limit temperature T0 of the guaranteed temperature range for the hydrogen tank. For this guaranteed temperature range, a temperature range wherein the tank valves VT1 through VT4, O-rings, etc., of the hydrogen tanks 51 through 54 can withstand use should be selected. When the temperature TN exceeds the threshold temperature Tc1, (Step S12: NO), then the frequency of use of the selected hydrogen tank is incremented by 1 (Step S17a), the tank valve for the selected hydrogen tank is opened (Step S17b), and the supply of hydrogen to the fuel cell 20 to generate electricity is started (Step S18).

On the other hand, if the temperature TN is less than the threshold temperature Tc1 (Step S12: YES), then the hydrogen tank with the next lowest frequency of use is selected as the hydrogen supply source in order to control the damage to the hydrogen tank (Step S13), and a check is performed as to whether or not all hydrogen tanks have been selected (Step S14), and if there are no hydrogen tanks that have not yet been selected (Step S14: NO), the control loops to Step S12. By selecting the hydrogen tanks in order of the lowest frequency of use in this way it is possible to equalize the frequency of use of the various hydrogen tanks 51 through 54. Moreover, by selecting directly, as the hydrogen supply source, another hydrogen tank when the temperature TN of the hydrogen tank that was selected based on the frequency of use is less than the threshold temperature Tc1, the damage to the hydrogen tank due to the drop in temperature can be controlled. If at this point the temperatures of all of the hydrogen tanks 51 to 54 are less than the threshold temperature Tc1 (Step S14: YES), then all of the tank valves VT1 to VT4 are opened (Step S15) to supply hydrogen to the fuel cell 20 from all of the hydrogen tanks 51 to 54. Doing so enables the control of the damage to the hydrogen tanks through reducing the amount of temperature drop of the hydrogen tanks by reducing the amount of hydrogen supplied per hydrogen tank. Next the output of the fuel cell 20 is controlled based on the hydrogen tank with the lowest temperature, and power generation is started (Step S16). When there is some degree of margin between the threshold temperature Tc1 and the lower limit temperature T0 of the guaranteed temperature range, controlling the output (the amount of electricity produced) of the fuel cell in this way makes it possible to insure the minimum required power for driving, without the vehicle stopping. Note that when the threshold temperature Tc1 is set to the neighborhood of the lower limit temperature T0 in the guaranteed temperature range, a structure may be used wherein all of the tank valves VT1 through VT4 are closed, and the vehicle is stopped, in order to avoid damaging the hydrogen tanks 51 through 54.

In performing the control of the power generation by the fuel cell 20, the power required by the load 70 is calculated based on the degree of opening of the accelerator, detected by the accelerator sensor 82, and the vehicle speed detected by the vehicle speed sensor 83 (Step 19), and the power proportion of the fuel cell 20 and the secondary battery (not shown) is calculated (Step 20). Following this, the amount of energy generated by the fuel cell 20 and the amount of hydrogen consumed by the fuel cell 20 (the amount of hydrogen supplied to the fuel cell 20 from the hydrogen tank) are calculated based on the amount of exhaust of the anode off gas, exhausted from the electromagnetic shutoff valve B3 (Step S21). Next, the degree of hydrogen adiabatic expansion (the amount of the drop in temperature) is calculated from the ratio of the internal pressure (tank residual pressure) and the discharge aperture pressure of the supply source tank, of the hydrogen tanks 51, 52, 53, and 54, selected as the hydrogen supply source. The degree of adiabatic expansion of the hydrogen can be calculated from the first-stage pressure (the pressure detected by the pressure sensors P1 through P4) of the first-stage regulators A1 through A4, and the second stage pressure (the pressure detected by the pressure sensor P5). Next, the amount of heat absorption Q1 of the supply source tank is estimated by calculating the amount of hydrogen consumed and the product of the hydrogen flow times the drop in temperature due to the degree of adiabatic expansion (Step S23). Following this, the amount of heat Q2 absorbed from the external atmosphere by the supply source tank is calculated based on the external atmosphere temperature detected by the temperature sensor T5 (Step S24), and the total amount of heat absorbed Q, absorbed by the supply source tank, is calculated as "amount of heat absorbed Q1−amount of heat absorbed Q2" (Step S25). Next the temperature drop $\Delta T$ of the supply source tank is calculated from the heat capacity of the supply source tank, the tank temperature, and the total amount of heat absorbed Q (Step S26). Next the temperature TN' of the supply source tank is estimated by "TN'=TN−$\Delta T$" (Step S27) and a check is performed as to whether or not the temperature TN' is less than the threshold temperature Tc2 (Step S28). A temperature lower than the threshold temperature Tc1 and higher than the lower limit temperature T0 of the guaranteed temperature range, for example, should be used as the threshold temperature Tc2 (T0<Tc2<Tc1). If the temperature TN' is higher than the threshold temperature Tc2 (Step S28: NO), then the processing jumps to Step S38.

On the other hand, if the temperature TN' is less than the threshold temperature Tc2 (Step S28: YES), the hydrogen tank with the lowest frequency of use that has not been selected as the hydrogen supply source is selected as the hydrogen supply source in order to avoid damaging the hydrogen tanks (Step S29). Next a check is performed as to whether or not the temperature TN of the hydrogen tank that has been selected is less than the threshold temperature Tc1 (Step S30). If TN is less than Tc1 (Step S30: YES), then the hydrogen tank that has the next lowest frequency of use is selected as the hydrogen supply source (Step S31). Following this, a check is performed as to whether or not all hydrogen tanks have been selected (Step S32), and if there is a hydrogen tank that has not yet been selected (Step S32: NO), then the processing loops back to Step S30. If at this point the temperatures of all of the hydrogen tanks 51 to 54 are less than the threshold temperature Tc1 (Step S32: YES), then all of the tank valves VT1 through VT4 are opened (Step S33) to supply hydrogen to the fuel cell 20 from all of the hydrogen tanks 51 to 54. Next, the generation of electricity is begun with the output power of the fuel cell 20 limited, using the hydrogen tank with the lowest temperature as the standard (Step S34). A configuration may also be used wherein all of the tank valves VT1 through VT4 are closed and the vehicle is stopped if the temperatures of all of the hydrogen tanks 51 through 54 are less than the threshold temperature Tc1 to begin with (Step S32: YES). On the other hand, if the temperature TN of the selected hydrogen tank exceeds Tc1 (Step S30: NO), then the frequency of use of the selected hydrogen tank is incremented by 1 (Step S35), the tank valve is opened (Step S36), and the generation of electricity is started in the fuel cell 20 (Step S37).

In Step S38 a check is performed as to whether or not the intermittent operation start conditions have been fulfilled. The intermittent operations refer to an operating mode wherein the vehicle is driven by electric power supplied from a power storage device with the operation of the fuel cell 20 halted when there is a low load to the degree that the vehicle can be driven by electric power supplied from an electric power storage device, such as a secondary battery, or the like, when, for example, driving at a low speed or when idling. If the intermittent operation start conditions are not fulfilled (Step S38: NO), then the control jumps to Step S10. If the intermittent operation start conditions are fulfilled (Step S38: YES), then the tank valves VT1 to VT4 and the electromagnetic shutoff valves V1 to V3 are all closed (Step S39), and the generation of electrical power is halted (Step S40). At this time, a hydrogen leak check may be performed to conform to the safety of the system. This hydrogen leak check may be performed using the same procedure as in Step S7. Next a check is performed as to whether or not the intermittent operating end conditions have been fulfilled (Step S41). If the intermittent operation end conditions have not been fulfilled (Step S41: NO), then the control jumps to Step S38. On the other hand, if the intermittent end conditions are fulfilled (Step S41: YES), then all of the tank valves VT1 through VT4, and the electromagnetic shutoff valves V1 and V2 are opened in order to reduce the startup time by rapidly supplying hydrogen to the hydrogen supply tube 31 and the fuel cell 20 (Step S42). The fuel cell 20 shifts to normal operation and electrical power are generated. Following this, a check is performed as to whether or not there has been a request for stopping the system (Step S43), and if there is no system stop request (Step S43: NO), then the control jumps to Step S19. If there is a system stop request (Step S43: YES), then the tank valves VT1 through VT4, and the electromagnetic shutoff valves B1 through B2 are all closed (Step S44), and the system is stopped (Step S45).

The present form of embodiment selects and switches to the hydrogen tank to become the hydrogen supply sources based on the temperature states of the hydrogen tanks 51 to 54, and thus is able to prevent damage to the hydrogen tanks 51 to 54 by drops in the tank temperature. Moreover, while there is the risk of permanent deformation to the mechanical components, etc., and of a loss of seal quality in hydrogen tanks due to maintaining high pressures for extended periods of time in those hydrogen tanks for which the frequency of use is low, selecting hydrogen tanks using the frequency of use as a selection criterion makes it possible to equalize the frequencies of use of the various hydrogen tanks 51 to 54, which can eliminate this type of problem.

A-(3). Other Forms of Embodiment:

Note that even though the frequency of use was used as an embodiment of a selection criterion for the hydrogen tank to serve as the hydrogen supply source, the invention is not limited thereto, but rather the cumulative times of use of the hydrogen tanks 51 to 54 or the multiplicative products of the cumulative times of use and the tank internal pressures, etc., or other values that can quantitatively evaluate the state of use of the hydrogen tanks 51 to 54 can be used as selection criteria. Moreover, in equalizing, insofar as is possible the frequencies of use of the hydrogen tanks 51 to 54, the frequencies of use should not be reset (cleared to 0) when the hydrogen tanks are filled with hydrogen. Moreover, the histories of use of the hydrogen tanks 51 to 54, the temperatures of the tanks, or both in combination may be used as selection criteria. When both are combined, then the selection criteria may be set using either one as having higher priority. For example, while in the embodiment described above (Step S11 through S14 and Step S29 through S32), the selection criteria were set with the frequency of use having higher priority than the tank temperature, instead the selection criteria may be set with the tank temperature having higher priority than the frequency of use.

Furthermore, while in the embodiment described above (Steps S21 to S27) the tank temperatures were estimated from the degree of adiabatic expansion of the hydrogen, which is physical quantity related to the gas that is supplied from the tank, and this estimated temperature was used as the decision criterion for switching tanks, instead the tank temperature may be estimated from a physical quantity related to the tank temperature (a physical quantity other than the degree of adiabatic expansion) and this estimated temperature may be used as the decision criterion for switching the tank. For example, while the aforementioned temperature sensor T 1 through T5 and pressure sensor P1 through P5 function as detecting means for detecting physical quantities relating to the temperatures of the hydrogen tanks 51 to 54, other physical sensor instead may be used to detect physical quantities relating to the tank temperatures. Note that it is not an absolute necessity to perform an estimation calculation for the tank temperatures, but rather the tank temperatures detected by the temperature sensors T1 through T4 may be used as the decision criteria for switching tanks.

Furthermore, while in the embodiment described above (Step S29), the tanks were switched when it was determined that a tank temperature had fallen below the guaranteed temperature range, it is not absolutely necessary to switch the tank, but rather the supply of hydrogen may be continued with a constraint on the amount of hydrogen supplied from the hydrogen tank that is selected as the hydrogen supply source to the fuel cell 20. When the amount of hydrogen supplied from the hydrogen tanks is to be limited, handling measures should be put in place such as limiting the amount of electricity generated by the fuel cell 20, for increasing the amount of electrical power supplied to the load 70 from the electrical power storage device, such as the secondary battery, etc.

Furthermore, while in the embodiment described above, hydrogen tanks 51 to 54, filled with high pressure hydrogen gas were used as an embodiment of a hydrogen supply source, the invention is not limited thereto, but rather may use, for example, hydrogen occlusion tanks wherein a hydrogen occluding alloy that can reversibly occlude and release hydrogen is filled into tank containers, may be used instead. A hydrogen occlusion alloy is an alloy that reacts with hydrogen to form a metal hydride, wherein the hydrogenation and dehydrogenation reactions progress at a favorable reaction speed under practical conditions, and are reversible. For example, the hydrogen occluding alloy has the properties of occluding hydrogen and releasing heat when the pressure of the hydrogen gas is increased or the temperature of the hydrogen gas is decreased, and releasing hydrogen and absorbing heat when the pressure of the hydrogen gas is decreased or the temperature of the hydrogen gas is increased. Mg—Ni alloys, La—Ni alloys, Ti—Mn alloys, or the like, are well suited as hydrogen occluding alloys. Moreover, while in the embodiment described above, a case was described wherein a plurality of hydrogen tanks 51 to 54 were provided, the number of hydrogen tanks provided in the hydrogen supply device 50 may be only a single tank.

B. Second Embodiment

Figure 7:
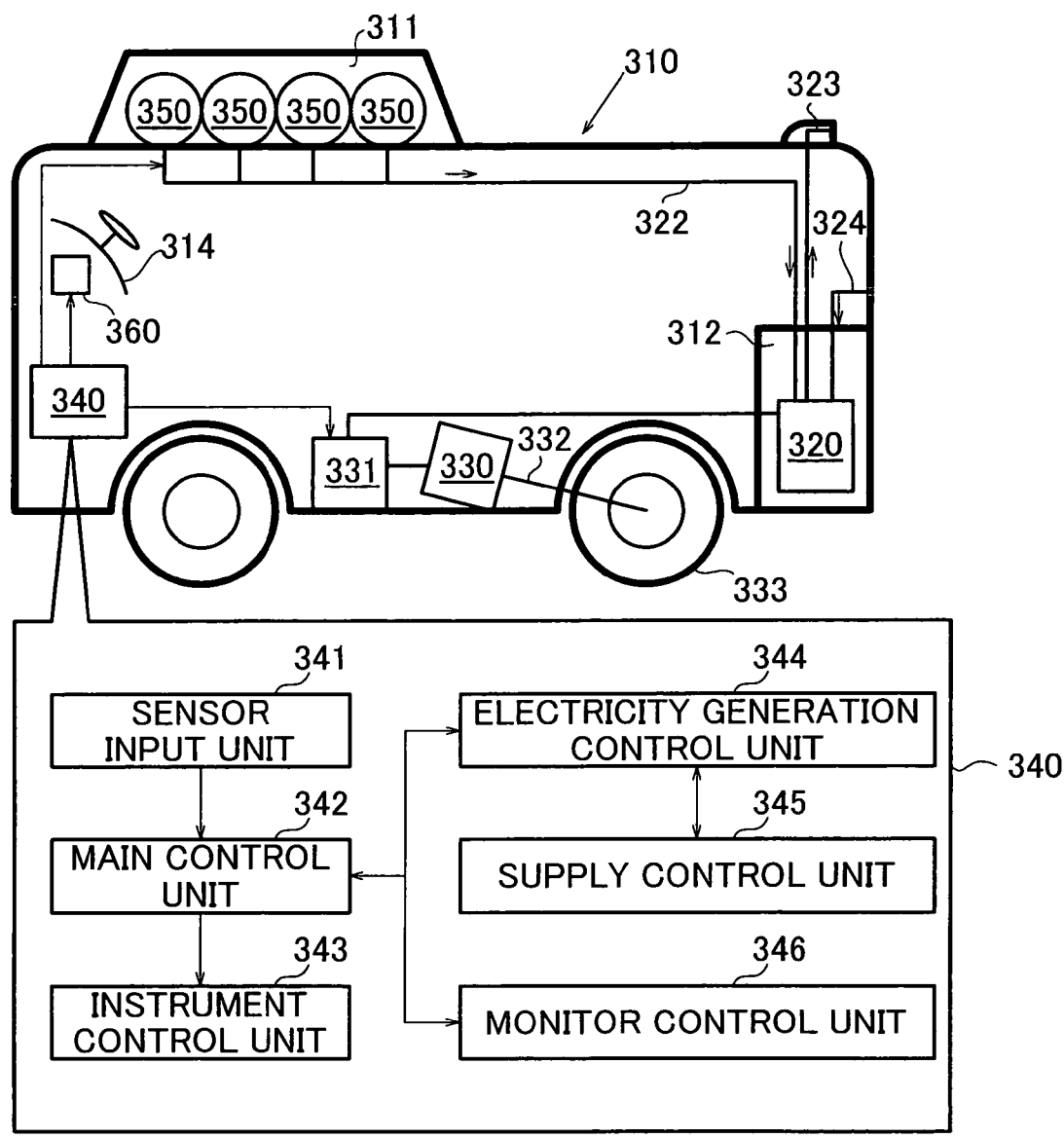
FIG. 7 is an explanatory diagram illustrating schematically the configuration of a vehicle 310 in a second embodiment.

B-(1). System Configuration:

FIG. 7 is an explanatory diagram showing a schematic configuration of a vehicle 310 according to a second embodiment. The vehicle 310 is driven by the driving force of a motor 330, using as a source of electrical power a fuel cell 320 that is installed in a fuel cell compartment 312 in the rear of the vehicle 310. The motor 330 may use any of a variety of types, but in the present embodiment a synchronous electric motor is used. The direct current outputted from the fuel cell 320 is converted into a three-phase alternating current by an inverter 331. The motor 330 is driven by this 3-phase alternating current. The motive force of the motor 330 is transmitted to a wheel 333 through a rotating shaft 332 to drive the vehicle 310.

The fuel cell 320 produces electricity through an electrochemical reaction between hydrogen and oxygen. While any of a variety of types of fuel cells may be used in the fuel cell 320, in the present form of embodiment a solid-state polymer type is used. Air is supplied from the outside through a supply tube 324 to an oxygen electrode. Hydrogen is supplied sequentially through a supply tube 322 from a plurality of hydrogen tanks 350 equipped in a hydrogen tank compartment 311 on the roof After the air and the hydrogen that is supplied to a hydrogen electrode are used in generating electricity, they are exhausted to the outside from an exhaust tube 323. The configuration of the hydrogen and air supply systems will be described below.

The operations of the various mechanisms housed in the vehicle 310, such as the inverter 331, are controlled by a control unit 340. The control unit 340 is configured as a microcomputer comprising an internal CPU, ROM, RAM, and so forth, where the operations of each unit are controlled according to a control program stored in the ROM.

FIG. 7 shows the functional blocks of the control unit 340. In the present embodiment, these functional blocks are constituted in software in the control unit 340. Conversely, each functional block may be constituted in hardware instead.

All of the functional blocks work together under the control of a main control unit 342. The sensor input unit 341 receives and applies the inputs of signals from various types of sensors equipped in the vehicle 310. The sensors included, for example, temperature sensors and pressure sensors equipped in the supply systems that supply hydrogen and air to the fuel cell 320. The detection signals from the sensors include the degree of opening of the accelerator, which corresponds to the required power when driving.

An electricity generation control unit 344 controls the generation of electricity of the fuel cell 320 depending on the required power. A supply control unit 345 supplies hydrogen to the fuel cell 320, divided into the individual hydrogen tanks 350, depending on the amount of electricity to be generated by the fuel cell 320. A motor control unit 346 controls the driving of a motor 330 so as to output the required power using the electrical power of the fuel cell 320.

An instrument control unit 343 controls the display on an instrument panel 360 equipped at the driver's seat 314 of the vehicle 310. This display includes the speed, the rpm of the motor 330, the temperature of the fuel cell 320, the shaft position, and so forth. The display also includes displays of the amount of remaining hydrogen, and fault displays for the supply system for the hydrogen tanks 350.

Figure 8:
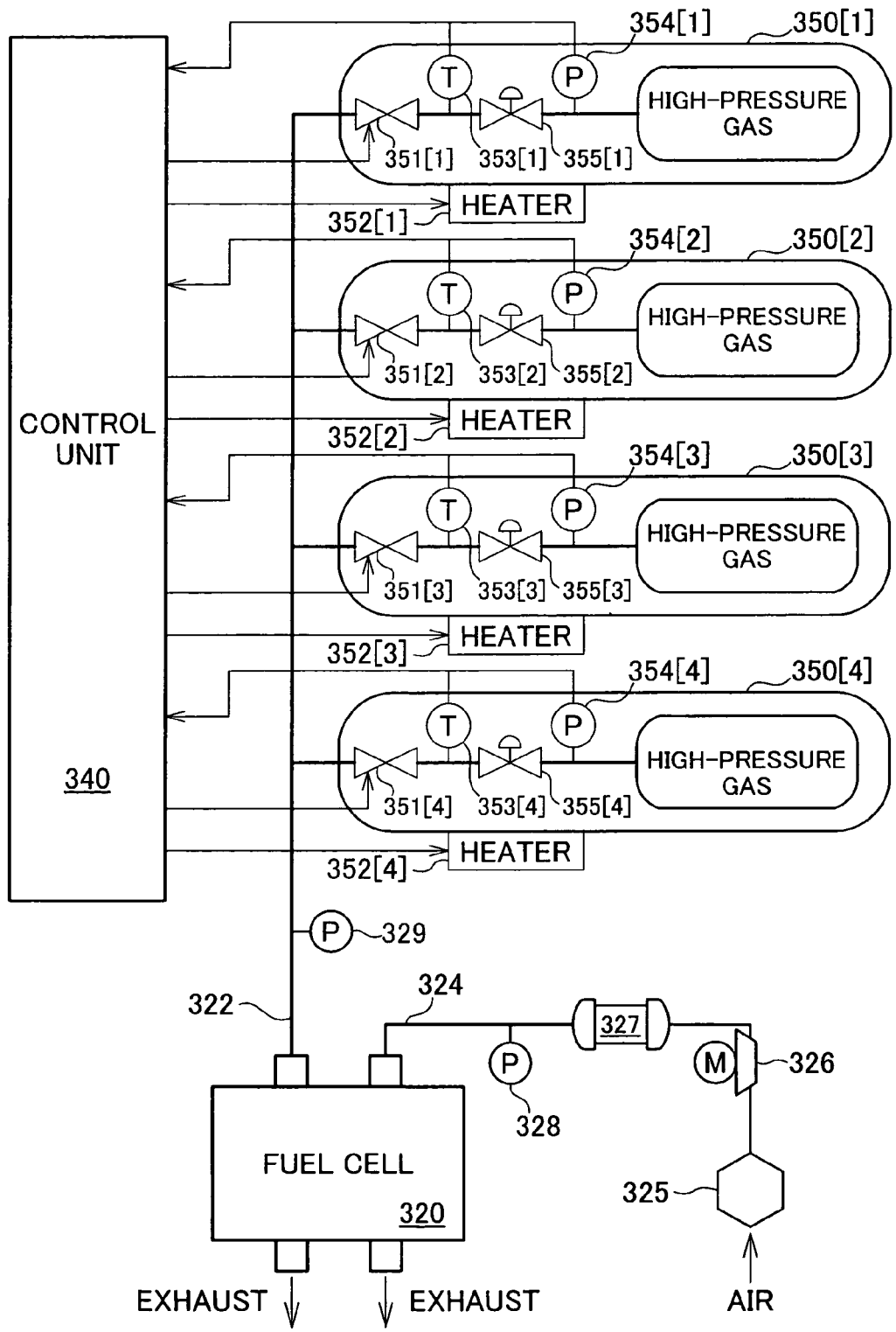
FIG. 8 is an explanatory diagram illustrating the configuration of a gas supply system to a fuel cell 320.

FIG. 8 is an explanatory diagram showing the configuration of the gas supply system to the fuel cell 320. As already explained, in the fuel cell 320 compressed air, as a gas containing oxygen, is supplied to a cathode, and hydrogen is supplied to an anode. The air is drawn in through a filter 325 and is compressed in a compressor 326, after which the air is humidified by a humidifier 327, and is supplied through a supply tube 324. A pressure sensor 328 for detecting the supply pressure of the air is equipped in the supply tube 324.

The hydrogen is supplied from four hydrogen tanks 350 through a supply tube 322 to the anode. In FIG. 8, each tank is assigned a tank number 1 through 4, for convenience in the explanation. In the below, the individual hydrogen tanks 350 will be referred to identified as the first tank through the fourth tank, according to the tank number. Because the hydrogen flows from the hydrogen tanks 350 to the fuel cell 320 in the gas supply system, for convenience in the explanation the side nearer the hydrogen tank 350 will be referred to as the upstream side, and the side nearer the fuel cell 320 will be referred to as the downstream side.

Each hydrogen tank 350 stores hydrogen at a high pressure of approximately 350 atmospheres. The hydrogen tanks 350 are equipped with regulators 355 for reducing the pressure of the hydrogen, and valves 351 that are opened and closed electromagnetically by control signals by the control unit 340. The hydrogen pressure is reduced stepwise along the supply tube 322 before being supplied to the fuel cell 320, but the pressure-reduction mechanisms are not shown in the drawing.

The hydrogen tanks 350 are equipped with temperature sensors 353 on the downstream sides of the regulators 355. The temperature sensors 353 are equipped at positions that are able to detect the temperatures of the hydrogen after pressure reductions by the regulators 355. The positions wherein the temperature sensors 355 are installed are not limited to the positions shown in the figure, but rather a variety of positions can be selected for measuring, either directly or indirectly, the operating temperatures of the regulators 355 and valves 351.

The temperature of the gas that is supplied from the hydrogen tank 350 falls due to adiabatic expansion when the pressure is reduced. The hydrogen tanks 350 are equipped with heaters 352 to not only curtain this drop in temperature, but also to expedite the recovery of the temperatures of the hydrogen tanks after the temperatures have fallen.

The hydrogen tanks 350 are equipped with pressure sensors 354, on the upstream sides of the regulators 355 in order to measure the storage pressures within the tanks. The supply tube 322 is also equipped with a pressure sensor, separate from these pressure sensors 354 for detecting the supply pressure of the hydrogen.

Figure 9:
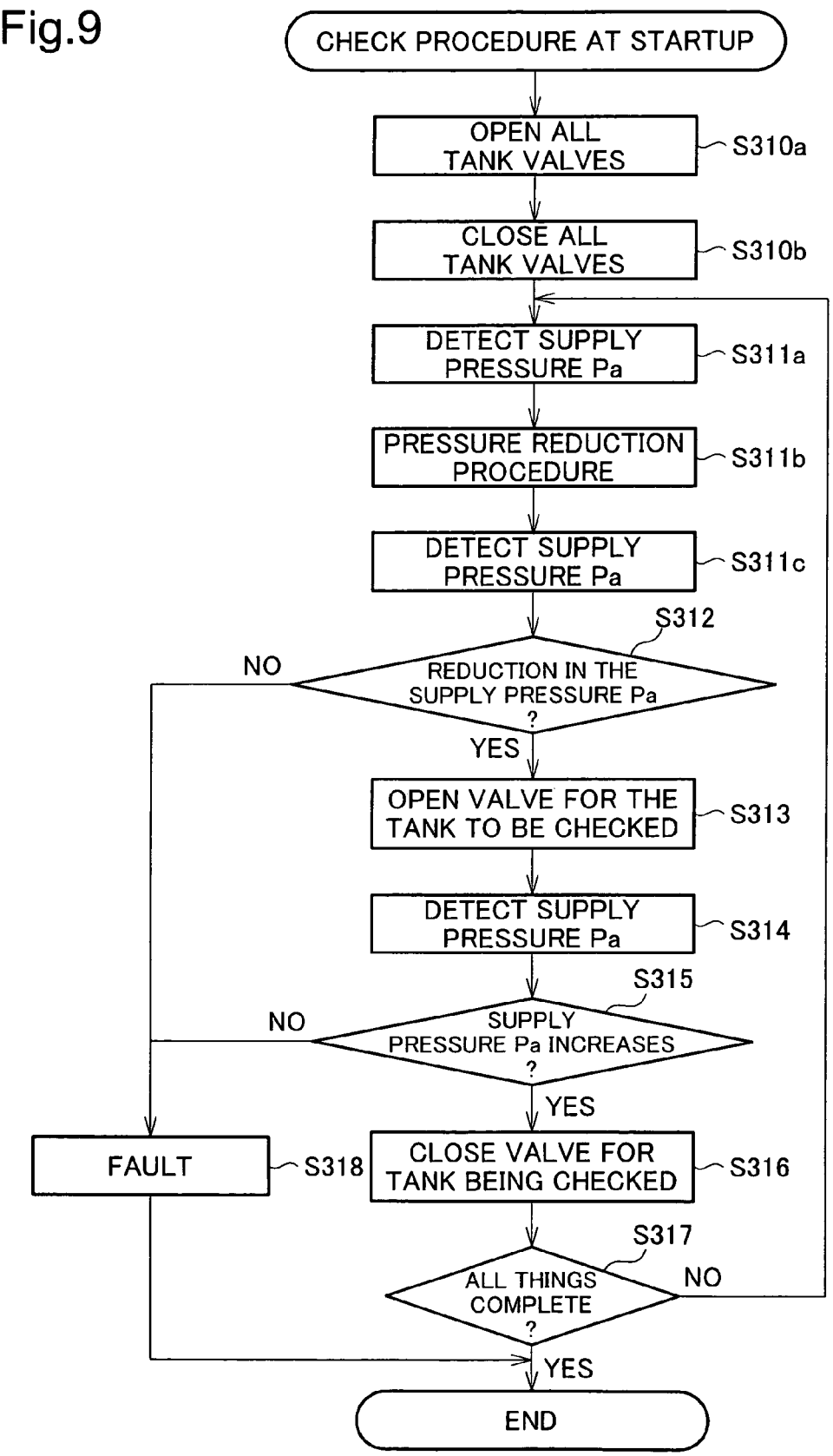
FIG. 9 is a flow chart illustrating a procedure for monitoring at the startup of a control unit 340.

B-(2). Procedure for Monitoring at Startup:

FIG. 9 is a flow chart showing the monitoring procedure at startup, performed by the control unit 340. The control unit 340 performs the startup monitoring procedure when there has been an instruction to run the fuel cell 320, such as the driver operating the start switch.

When this procedure begins, the control unit 340 opens the valves 351 in order to fill the supply tube 322 with hydrogen gas (Step S310a). After the supply tube 322 has been filled with hydrogen gas, the valves 351 for all of the hydrogen tanks 350 are closed (Step S310b), and the supply pressure Pa of the supply tube 322 is detected by the pressure sensor 329 (Step 311a). Because the supply of hydrogen is stopped by the closing of the valves 351, under normal circumstances the supply pressure Pa should fall due to the hydrogen gas in the supply tube 322 escaping to the fuel cell 320. In the present embodiment, the fuel cell 320 is run briefly to perform a pressure reduction procedure through consuming the hydrogen within the supply tube 322 in order to make it possible to detect, in a short period of time, the changes in the supply pressure Pa (Step 311b). After this, the supply pressure Pa in the supply tube 322 is detected again (Step S311c), to detect whether or not the supply pressure Pa has dropped during the pressure reduction procedure (Step S312). If the supply pressure Pa has not dropped (Step S312), then the control unit 340 concludes that either there is a leak in the valve 351 of one of the hydrogen tanks 350, or that the valve 351 is stuck in the open position, and the control unit 340 performs a fault determination procedure (Step S318). The fault determination procedure may be, for example, a procedure to set a fault determination flag that indicates the existence of a fault.

If the pressure Pa has dropped (Step S312), then the control unit 340 performs checks, in the sequence below, as to whether or not each individual valve 351 (1) through 351 (4) has opened correctly, for each hydrogen tank 350 (1) through 350 (4). The control unit 340 selects one of the hydrogen tanks 350 as the tank to be tested, opens the valve 351 for the tank to be tested (Step S313), and detects the supply pressure Pa (Step S314). If the valve 351 has opened correctly, then hydrogen should be supplied from the tank being tested, so the supply pressure Pa should rise. If the supply pressure Pa does not rise (Step S315), then the control unit 340 concludes that the valve 351 had a fault in its opening operation, and performs a fault determination procedure (Step S318). If the supply pressure Pa rises (Step S315), then the control unit 340 concludes that the valve 351 is normal, and closes the valve 351 of the tank being inspected (Step 316). The control unit 340 performs the check procedure of Steps S311a through S316 for all of the hydrogen tanks 350 (1) through 350 (4) while changing the tank to be inspected each time.

In the present embodiment, performing the monitor procedure at startup as described above, can increase the reliability of the operations of the valves 351 when switching the hydrogen tanks 350 used as the supply source. In the procedures described above, if, in Step S312, it may be concluded that the supply pressure has fallen when, for example, the supply pressure Pa falls below a specific threshold. Moreover, it may be concluded that the supply pressure Pa has fallen when the absolute value of the temporal rate of reduction of the supply pressure Pa is greater than a specific threshold. The same is true in Step S315 as well, where the conclusion may be based on the relative magnitude of the supply pressure Pa and a threshold value, or the conclusion may be based on the rate of change of the supply pressure Pa.

Figure 10:
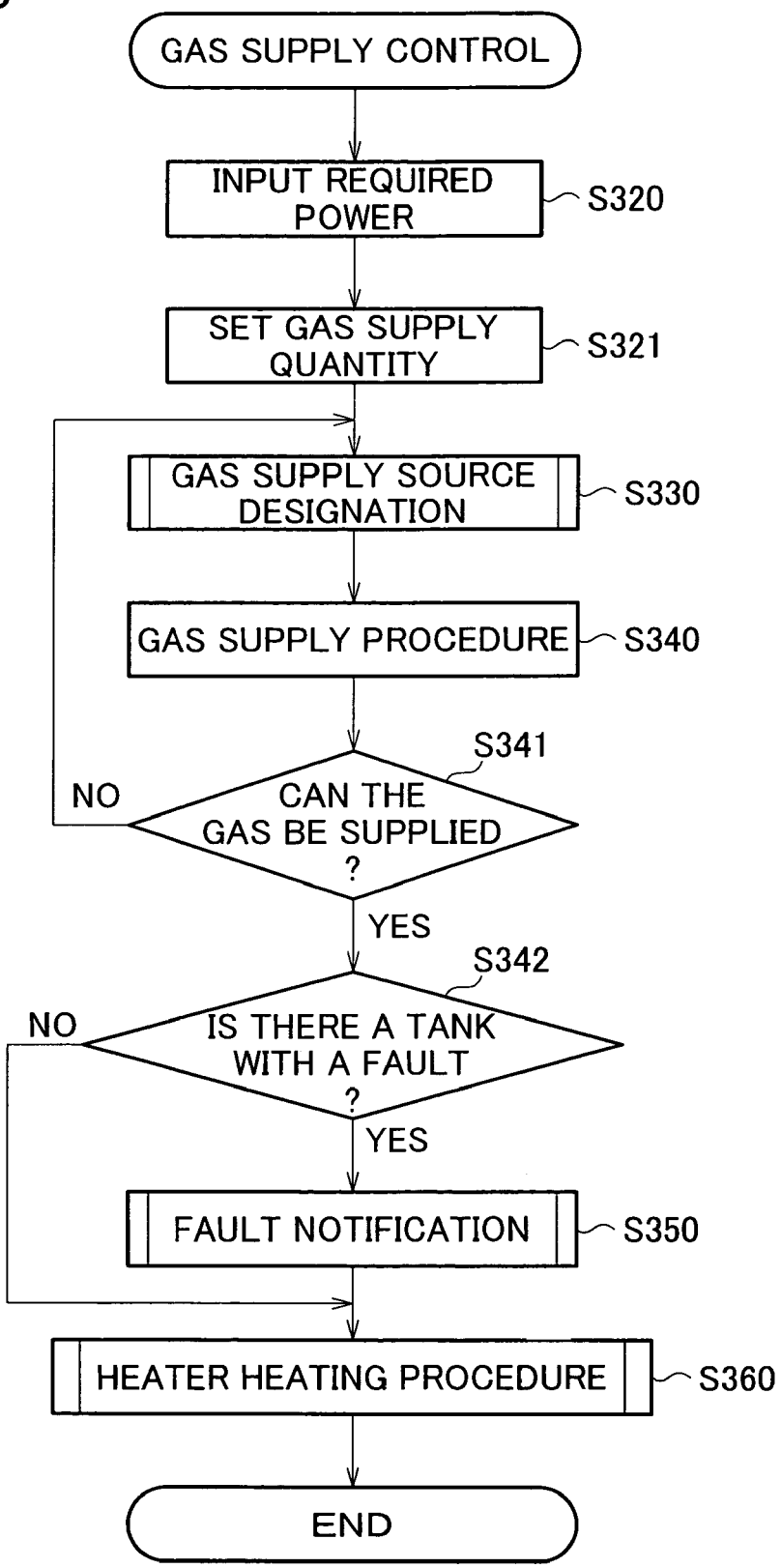
FIG. 10 is a flow chart illustrating the gas supply control for a control unit 340.

B-(3). Gas Supply Control:

FIG. 10 is a flow chart illustrating the gas supply control performed by the control unit 340. The control unit 340 iteratively performs the gas supply control in order to supply hydrogen in the amount that is required for the operation of the fuel cell 320, divided into the individual hydrogen tanks 350.

When this procedure is started, the control unit 340 inputs a required power based on the degree of opening of the accelerator (Step S320), and sets the amount of gas to be supplied (Step S321). The amount of gas to be supplied can be calculated based on a map, a coefficient, or the like that provides the amount of gas to be supplied in relation to a given power requirement.

Next the control unit 340 specifies the supply source for the gas (Step S330). For the reasons explained below, in the present form of embodiment, the hydrogen is supplied by switching sequentially the hydrogen tank 350 that serves as the supply source. When hydrogen is supplied from a hydrogen tank 350 that stores the hydrogen at a high pressure, the adiabatic expansion causes the temperature of the hydrogen to drop extremely. This drop in temperature can have negative effects such as failures in the opening/closing operations, reduced useful life spans, reduced performance, etc., caused by the hardening of resin components in the valves 351. Given this, in the present embodiment the supply source is changed sequentially in order to avoid continuously supply hydrogen from any single hydrogen tank 350 to the degree that would lead to these problems. That is to say, rather than switching to the next hydrogen tank 350 after one hydrogen tank 350 is emptied, all four of the hydrogen tanks 350 are used sequentially and intermittently as the supply source. The gas supply source designation procedure (Step S330) is a procedure that selects the hydrogen tank 350 to be used as the supply source based on the approach described below. The details of the gas supply source designation procedure are described below.

The control unit 340 controls the valve 351 of the selected hydrogen tank 350 to supply the gas (Step S340). If, for reasons of a fault, etc., in the regulator 355 or the valve 351, it is not possible to supply the gas (Step S341), then the gas supply source designation procedure is performed again (Step S330), and an attempt is made to supply the gas from another hydrogen tank 350. In Step 341, the control unit 340 may conclude that there is a fault in the supply of the gas when, for example, the supply pressure Pa of the supply tube 322 has fallen. When it is concluded that there is a fault in the supply, then a fault determination flag should be set, as already explained in the check procedures at startup (FIG. 9).

The control unit 340 notifies the driver that there is a fault (Step S350) if, in the check procedure at startup (FIG. 9) or in the procedures in Steps S320 through S341, described above, a hydrogen tank is discovered to have a fault (Step S342). This procedure will be described below. If there is no fault, then the control unit 340 skips the fault notification procedure (Step S350).

The control unit 340 performs heating, using a heater (Step S360) so that the drop in temperature of the valves 351 of each of the hydrogen tanks 350 accompanying the supply of hydrogen will not be too great. The control of power to the heater will be described below.

The control unit 340 supplies hydrogen so as to be able to generate electricity commensurate with the required power, doing so through iterating the procedures described above. The gas supply control procedure shown in FIG. 10 is not more than one embodiment, where the various procedures in this gas supply control procedure may be performed in different processing orders, or may be performed in parallel, as appropriate.

Figure 11:
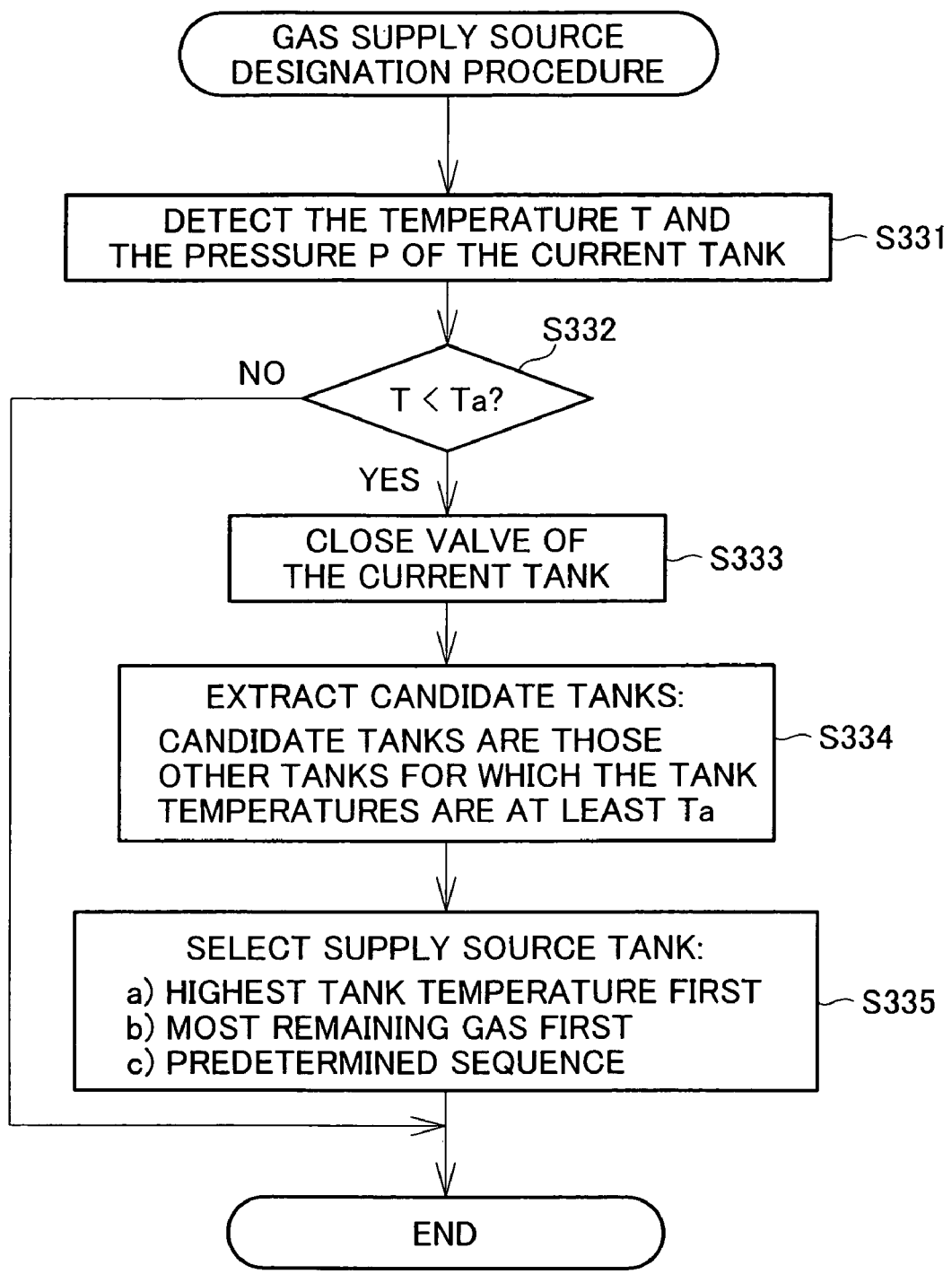
FIG. 11 is a flow chart illustrating the gas supply source designation procedure for a control unit 340.

B-(3-1). Procedure for Designating Gas Supply Source:

FIG. 11 is a flow chart showing the gas supply source designation procedure performed by the control unit 340. The gas supply source designation procedure is the procedure corresponding to Step S330 of the gas supply control (FIG. 10), described above, a procedure for selecting the hydrogen tank 350 to serve as the supply source so as to avoid damage accompanying a drop in temperature due to the adiabatic expansion of the hydrogen. In the present embodiment, the supply source is selected based on the detection values by the temperature sensors 353 and pressure sensors 354 of the individual hydrogen tanks 350.

When the gas supply source designation procedure is started, the control unit 340 detects the temperature T and the pressure P for the hydrogen tank 350 that is currently the supply source (hereinafter termed the "current tank") (Step S331). Initially, when this procedure is performed, or in other words, when there is no current tank, the procedure is performed with both the temperature T and the pressure P defined as 0. Moreover, the control unit 340 stores, as the initial temperature T0, the temperature T at the point in time when the use of the current tank is started.

The control unit 340 switches the current tank when the condition "temperature T<threshold value Ta" is fulfilled (Step S332). When this condition is not fulfilled, the current tank continues to be used, and the gas supply source designation procedure is terminated.

The condition of "temperature T<threshold value Ta" (Step S332) is the condition for preventing the temperature of the current tank from dropping to far. In the present embodiment, −10° C. is used as the threshold value temperature Ta. The threshold value Ta can be set to the minimum temperature wherein normal operation can be insured for the various components such as the regulator 355 and the valve 351, or can be set to a temperature a specific amount higher than this minimum temperature. Moreover, the threshold value Ta can be set to a temperature that is a temperature that is a specific amount lower than the tank temperature when the current tank was switched, and higher than the lower limit temperature, for example, set to a temperature that is 5° C. lower than the temperature that the tank was when the supply source was switched. Moreover, the threshold value Ta may be set so as to fulfill the condition "temperature T<threshold value Ta" when the difference between the tank temperature and the temperature of another hydrogen tank 350 that is not the current tank (for example, the difference with the average tank temperature of the other hydrogen tanks 350) reaches a specific temperature difference.

In Step S332, if it is determined that the current tank should be switched, and then the control unit 340 closes the valve 351 on the current tank (Step S333). Following this, those tanks among the hydrogen tanks 350 that are not the current tank and that have tank temperatures at or above the threshold value Ta are identified as candidate tanks (Step S334). A plurality of candidate tanks may be identified.

The control unit 340 selects from the identified candidate tanks the tank to become the supply source (Step S335). The tank to become the supply source may be selected based on a variety of criteria, but in the present embodiment, the following three criteria are used:

a) Tanks with the highest temperature first;
b) Tanks with the most remaining gas first;
c) A preexisting sequence.

The aforementioned criteria are applied with the priority sequence being a) through c), that is, first the tank with the highest temperature is selected from the plurality of candidate tanks based on criterion a). If there is a plurality of candidate tanks selected in this way, then next the tank with the greatest amount of the gas remaining, or in other words, the tank with the greatest pressure P, is selected based on criterion b). If there is still a plurality of candidates, then the selection is done using a preexisting sequence, such as "first tank→second tank→third tank→fourth tank," based on criterion c). These criteria may be set in a variety of ways, for example, any single one of the criteria a) through c) may be used, or the criteria a) through c) may be applied with a different priority order than which is described above.

Figure 12:
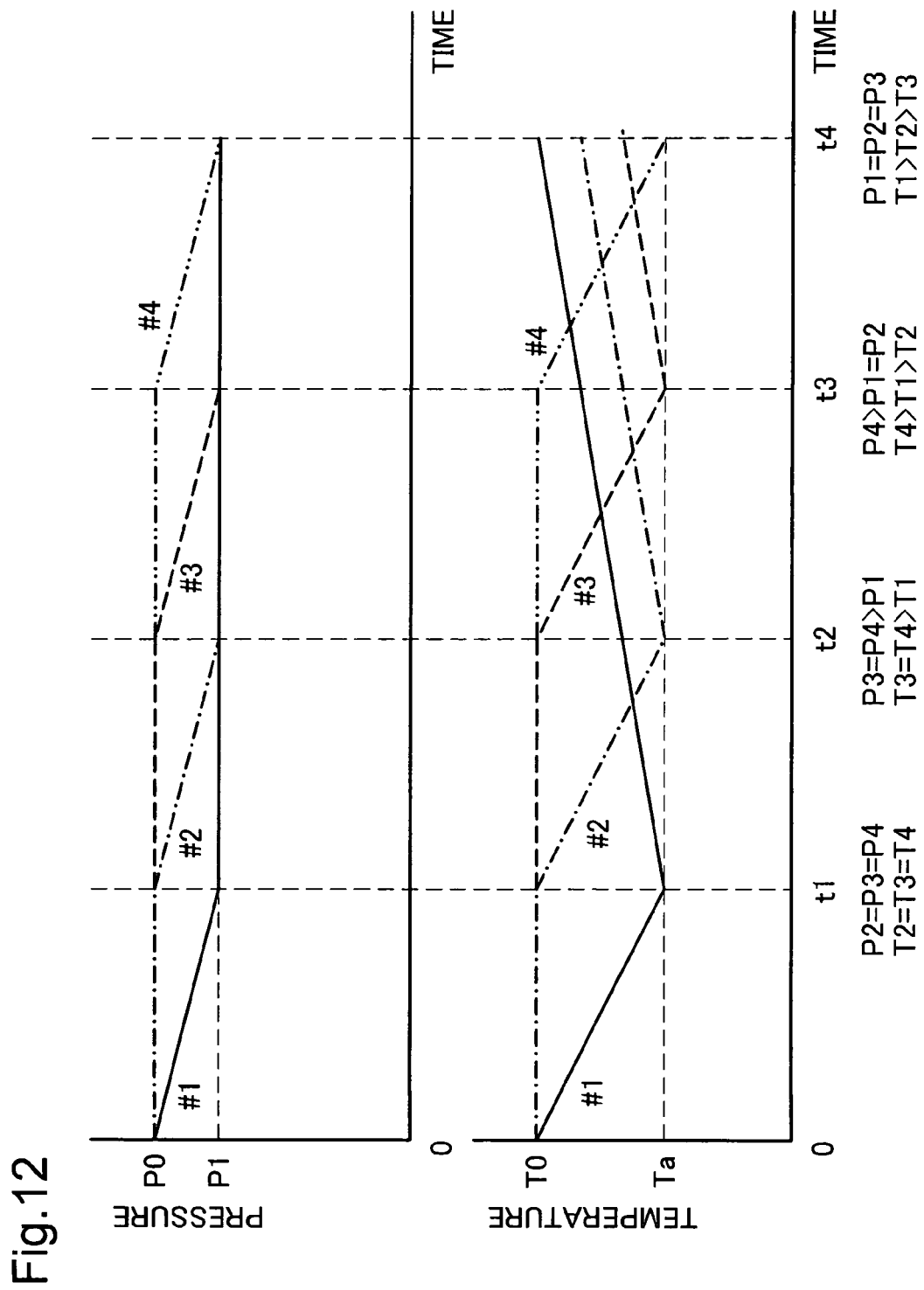
FIG. 12 is an explanatory diagram illustrating an embodiment of selecting a supply source tank.

FIG. 12 is an explanatory diagram showing an embodiment of selecting a supply source. The changes in pressure and temperature of the first tank (#1) through the fourth tank (#4) over time are shown. In this embodiment, the explanation is of a situation wherein the sequence of "first tank→second tank→third tank→fourth tank" has been set.

At time 0, all of the hydrogen tanks 350 (1) through 350 (4) are in identical initial states for the pressures P0 and the temperatures T0. Consequently, the first tank is selected as the supply source based not on criterion a) which is based on temperature nor on criterion b) which is based on the amount of hydrogen remaining, but rather on the sequence of criterion c).

The result is that during the interval from time 0 through t1, the pressure P1 in the first tank drops, and the temperature t1 drops commensurately. At time t1, the temperature in the first tank reaches the threshold value Ta, and so the supply source is switched. At this point in time, the candidate tanks are the second tank through the fourth tank. The pressures P2 through P4 and the temperatures T2 through T4 of these tanks are all identical. Consequently, the tank following the first tank, or in other words, the second tank, is selected by the sequence of criterion c) as the supply source tank.

The result is that during the interval from time t1 to t2, the pressure P2 in the second tank falls, and the temperature T2 also falls accordingly. Because the supply of hydrogen from the first tank has been stopped, the pressure P1 does not change. Because there is no cooling effect due to the discharge of hydrogen, and because of heating using a heater, the temperature T1 gradually rises.

At time t2 the temperature of the second tank reaches the threshold value Ta, and so the supply source is switched. At this time, the candidate tanks are the first tank, the third tank, and the fourth tank. The pressures P1, P3 and P4, and the temperatures T1, T3 and T4 of each of these tanks have the following relationships:

Pressures: $P3=P4>P1$;

Temperatures: $T3=T4>T1$.

Consequently, given criterion a), the first tank, which has the lowest temperature, is excluded as a candidate for the supply tank, so the candidate tanks are the third tank and the fourth tank. If the end, the tank following the second tank in the sequence in criterion c), or in other words, the third tank, is selected as the supply source tank.

At time t3 the temperature of the third tank reaches the threshold value Ta, so the supply source is changed. The candidate tanks at this time are the first tank, the second tank, and the fourth tank. The pressures P1, P2, and P4, and the temperatures T1, T2, and T4 of each of these tanks have the following relationships:

Pressures: $P4>P1=P2$;

Temperatures: $T4>T1>T2$.

Consequently, the fourth tank, which has the highest temperature, is selected as the supply source tank by criterion a). Following this, the supply source tanks can be selected as appropriate through the application of the criteria a) through c) in this same manner.

Figure 13:
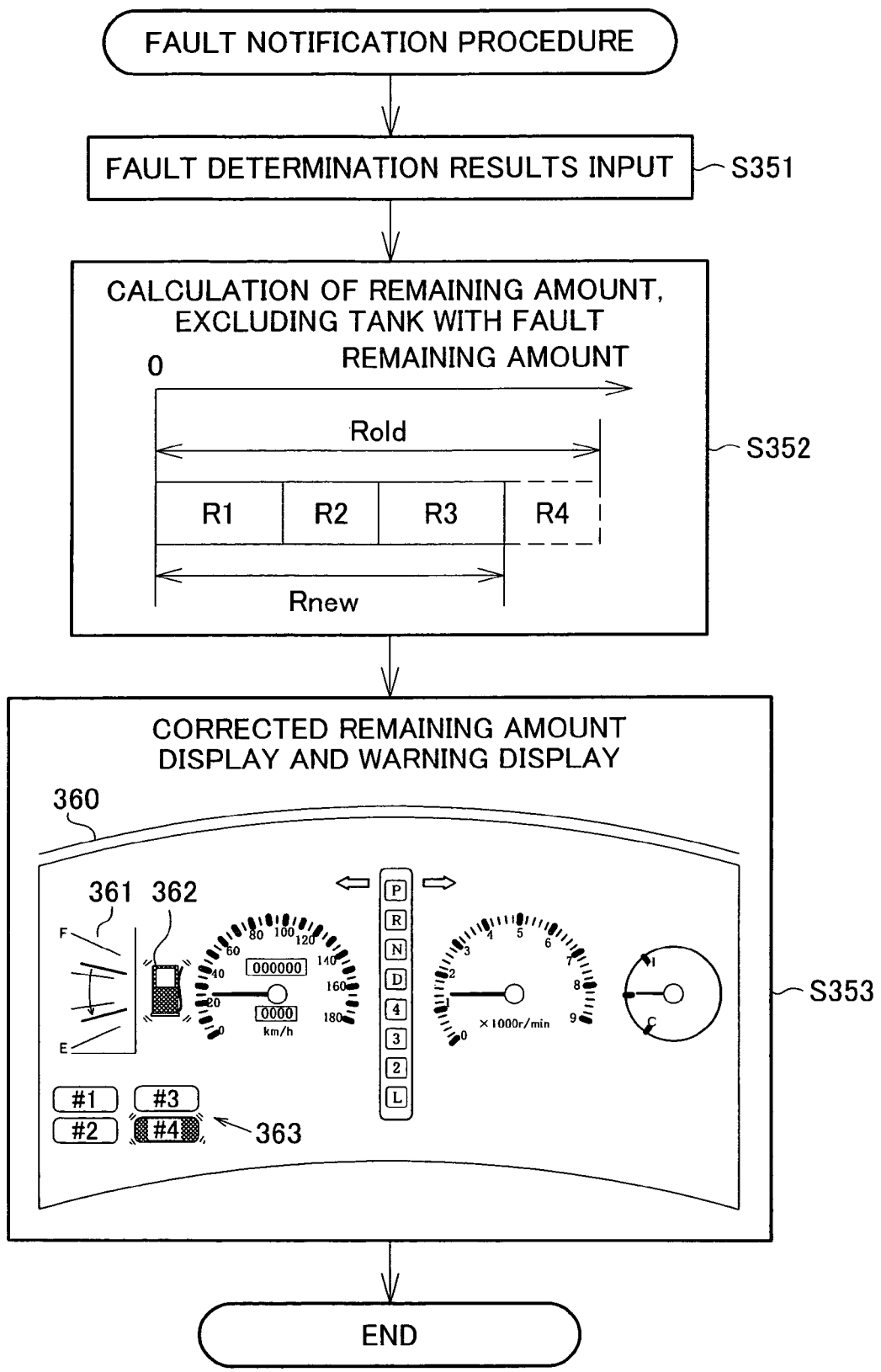
FIG. 13 is a flow chart illustrating a procedure for fault notification in a control unit 340.

B-(3-2). Procedure for Fault Warnings:

FIG. 13 is a flow chart illustrating the procedure for fault notification performed by the control unit 340. The fault notification procedure is the procedure corresponding to Step S350 in the gas supply control procedure (FIG. 10) and is the procedure for notifying the driver of the existence of a fault in any of the four hydrogen tanks 350.

When the fault notification procedure is started, the control unit 340 inputs the fault check results (Step S351). For the fault check results, the fault determination flags set in the check procedure at startup (Step S318 in FIG. 9) or the gas supply control procedure (Step S341 in FIG. 10), for example, can be used. In the present embodiment, the specific individual tank wherein there is a fault, of the first tank through the fourth tank, can be specified based on the fault determination flags.

The control unit 340 calculates the amount of gas remaining, excluding the tank wherein there is the fault (Step S352). FIG. 13 shows a method of calculating the amount of remaining gas, using as an embodiment the case wherein a fault has been detected in the fourth tank. As is shown in the figure, the amounts of gas remaining in the first tank through the fourth tank, at the point in time prior to the detection of the fault were R1 through R4, respectively. At the point in time prior to the detection of the fault, the total amount of remaining gas Rold is calculated as "R1 +R2 +R3 +R4." The control unit 340 ignores the amount of gas R4 remaining in the fourth tank when a fault has been detected in the fourth tank, and thus the total amount of gas remaining Rnew is calculated as "R1 +R2 +R3."

The control unit 340 not only corrects the display of the amount of gas remaining based on the results of calculating the amount of gas remaining, but also provides a warning display to the driver (Step S353). FIG. 13 shows an embodiment of an instrument panel 360 for a vehicle 310. In the present embodiment, the left side of the instrument panel 360 is equipped with a remaining gas gauge 361, a remaining gas warning lamp 362, and fault warning lamps 363 for each of the tanks. Because the amount of gas remaining will be decreased rapidly by the calculation in Step S352, the value displayed on the remaining gas gauge 361 will also drop, as shown in the figure, to Rold from Rnew. The control unit 340 flashes the remaining gas warning lamp 362 for a specific amount of time, regardless of the value for the amount of gas remaining Rnew, in order to inform the driver that the display of the remaining gas gauge 361 has been corrected. Instead of flashing the remaining gas warning lamp 362, the indicator of the remaining gas gauge 361 may be vibrated instead.

Along with these displays, the control unit 340 also light or flashes the fault warning lamp 363 for the hydrogen tank 360 for which the fault was discovered. In the embodiment in FIG. 13, a situation is shown wherein a fault has been discovered in the fourth tank. These displays are no absolutely necessary, and a portion thereof may be omitted depending on the configuration of the instrument panel 360.

Figure 14:
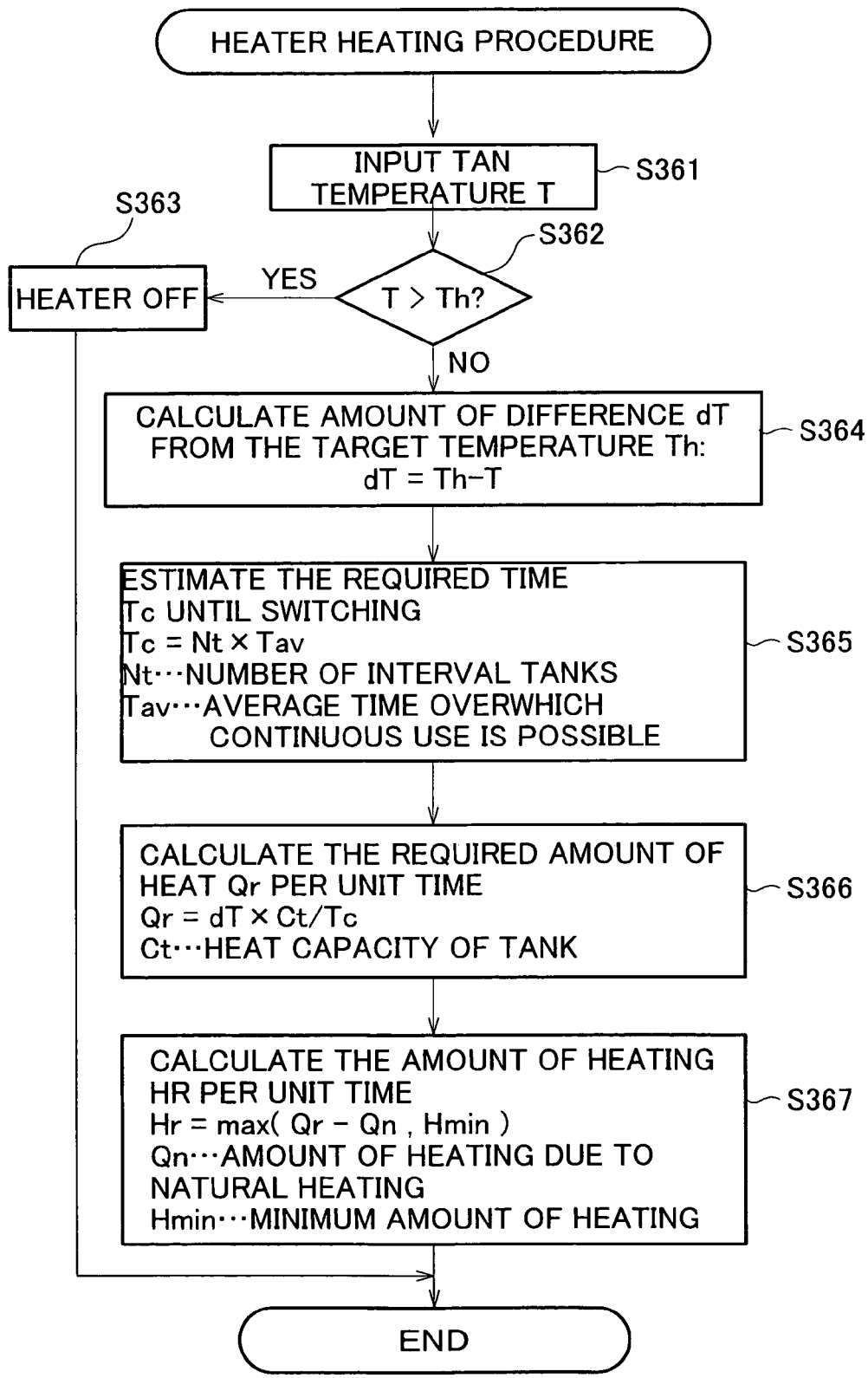
FIG. 14 is a flow chart illustrating a procedure for heating in a control unit 340.

B-(3-3). Procedure for Heating:

FIG. 14 is a flow chart illustrating the heater heating procedure performed by the control unit 340. This procedure corresponds to Step S360 in the gas supply control procedure (FIG. 10), and is a procedure for controlling whether or not to apply a current, and controlling the magnitude of the aforementioned current, to heaters 352 in each of the hydrogen tanks 350. The control unit 340 performs the heater heating procedure for each of the individual hydrogen tanks 350. For convenience in the description, the hydrogen tank 350 that is the subject of the control of the heater heating procedure will be termed the "applicable tank."

When the heater heating procedure is started, the control unit 340 receives an input of the temperature T for the applicable tank (Step S361). The control unit 340 concludes that heating using the heater 352 is unnecessary if this temperature T is greater than a target temperature Th that is set in advance, and turns off the current to the heater 352 (Step S363). The target temperature Th may be set based on, for example, a temperature for which the operation of various components of the hydrogen tank 350, such as the regulator 355 or the valve 351, are guaranteed to operate. In the present embodiment, the target temperature Th is set to 0° C.

If the temperature of the applicable tank is less than the target temperature Th, the amount of current to the heater 352 is set through the procedure described below. First the control unit 340 calculates the amount of difference dT between the target temperature Th and the temperature T of the applicable tank (Step S364). This amount of difference dT corresponds to the amount of increase in temperature required for the applicable tank.

The control unit 340 calculates the time required until changing, or in other words, the time required Tc until the applicable tank, which is the subject of control, can be used again, doing so using the following formula (Step S365).

$$Tc = Nt \times Tav \qquad (1)$$

Here Nt is the number of interval tanks, and Tav is the average time over which continuous use is possible.

The number of interval tanks Nt is the number of hydrogen tanks 350 that will be used before the applicable tank will be used next as the supply source for the hydrogen. For example, let us consider the case wherein all four of the hydrogen tanks 350 can be used. If immediately following the end of hydrogen supply by the applicable tank, normally the applicable tank will be selected again as the supply source after the other three hydrogen tanks 350 have been used, and thus "Nt=3". After the applicable tank has finished supplying the hydrogen, then if another hydrogen tank 350 has also finished supply hydrogen, then "Nt=2". If the applicable tank will immediately be used as the supply source for the hydrogen, then handling is done with "Nt=0". Moreover, if a fault has been detected in any of the hydrogen tanks 350 and three hydrogen tanks 350, including the applicable tank, can be used, then immediately following the end of the supply of hydrogen by the applicable tank "Nt=2".

The average time over which continuous use is possible Tav is the average time for which hydrogen can be supplied continuously from a single hydrogen tank 350 without the temperature dropping too far, which can be calculated for, for example, the previous supply history. The average amount of time for which continuous use is possible Tav may be a constant, set, for example, to the time over which hydrogen can be supplied continuously without the temperature dropping too far when hydrogen is supplied at the maximum supply rate.

The control unit 340 calculates the amount of heat Qr required per unit time using the following formula based on the values calculated in Steps S364 and S365 (Step S366).

$$Qr=dT \times Ct/Tc \qquad (2)$$

Here, Ct is the heat capacity of the tank.

The required heat Qr indicates the amount of heat that must be supplied per unit time in order to raise the temperature of the applicable tank to the target temperature Th after a specific amount of time Tc. The temperature of the hydrogen tank 350 can be stabilized and restored to the target temperature Th by setting the required heat Qr in this way.

Finally, the control unit 340 sets the amount of heating Hr per unit time by the heater 352 based on the following formula, and controls the electric current to the heater 352 based thereon (Step S367).

$$Hr=\max(Qr-Qn, Hmin) \qquad (3)$$

Here Qn is the amount of heat due to natural heating, and Hmin is the minimum amount of heat. Max (A, B) is an operator that selects the larger of the two values A and B.

The amount of heat Qn through natural heating can be set in advance experimentally or analytically. The minimum amount of heat Hmin is the amount of heat that must be supplied, unconditionally, through the heater 352. For example, the heating is performed according to the minimum amount of heat Hmin when the applicable tank is used as the supply source for the hydrogen, or when the temperature of the applicable tank has approached the target temperature Th.

Setting the minimum amount of heat Hmin to a large value enables the prevention of a temperature drop when the applicable tank is used as the supply source for the hydrogen. Consequently, this has the benefit of being able to extend the time over which the tank can be used to supply hydrogen continuously, reducing the frequency with which the hydrogen tanks 350 are changed. If the minimum amount of heat Hmin is set to a small value, then the amount of energy consumed in the electric current to the heater 352 can be reduced, which has the benefit of increasing the energy efficiency in the fuel cell system. The minimum amount of heat Hmin can be set as desired, taking into consideration the need to prevent temperature drops in this way, and the need to increase energy efficiency.

As an modified embodiment of the heater heating procedure, the Steps S364 through S366, described above, may be omitted. That is, when the temperature T of the applicable tank is less than the target temperature Th, then the control unit 340 may apply an electric current to the heater 352 heating with the minimum amount of heat Hmin that has been set in advance, unconditionally.

B-(4). Effects:

In the second embodiment, described above, a plurality of hydrogen tanks 350 are used through switching the hydrogen tanks 350 depending on the temperature downstream of the regulators 355. This makes it possible to prevent the temperatures of various components, such as the regulators 355 and the valves 351, from dropping too far, thereby preventing a variety of problems, such as faults in the valve operations, decreased useful life spans of components, decreased performance, and so forth, caused by low temperatures.

Figure 15:
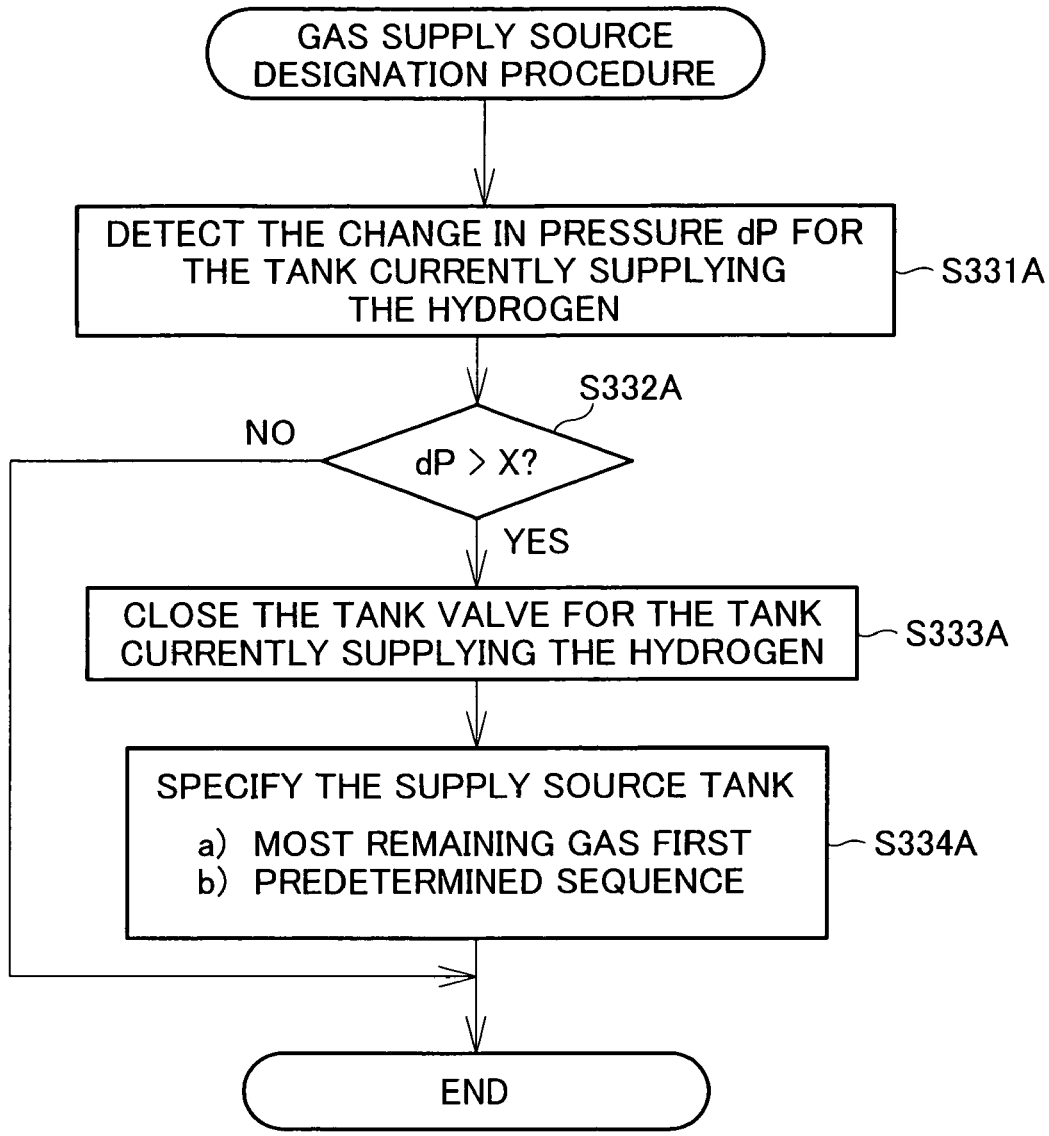
FIG. 15 is a flow chart illustrating a first modified embodiment of a procedure for gas supply source designation.

B-(5). Modified Forms of the Procedure for Designating the Gas Supply Source:

FIG. 15 is a flow chart showing a first modified embodiment of the gas supply source designation procedure. The gas supply source designation procedure shown in FIG. 15 is a procedure corresponding to Step S330 in the gas supply control (FIG. 10) described above. In the first modified embodiment, the supply source is selected based on the detection values of the pressure sensors 354 in a configuration wherein the temperature sensors 353 of each of the hydrogen tanks 350 have been omitted.

When the gas supply source designation procedure shown in FIG. 15 is started, the control unit 340 detects the change in pressure dP for the current tank, which is the hydrogen tank 350 that is currently supply the hydrogen (Step S331A). The change in pressure dP is the difference between the initial pressure Pini at the point when the supply of hydrogen from the current tank was started and the pressure P at the current time (dP=Pini−P). Initially, when this procedure is performed, or in other words, when there is no "current tank," the procedure is performed with the change in pressure dP defined as 0.

The control unit 340 switches the current tank when the condition of "change of pressure dP>threshold value X" is fulfilled (Step S332A). If any of the conditions are not fulfilled, then the use of the current tank is continued, and the gas supply source designation procedure is terminated.

The condition of change in "pressure dP>threshold value X" (Step S332) is a condition for avoiding too great a temperature drop in the current tank based on a change in temperature estimated from the change in pressure. The method of setting the threshold value X will be explained below. It is known that, in general, the temperature of a high-pressure gas that is supplied at a low pressure drops according to the following formula through adiabatic expansion.

$$T1=Ts(P1/Ps)^{(\gamma-1)/\gamma} \qquad (4)$$

T1 is the temperature (K) after the adiabatic expansion, and Ts is the initial temperature (K) prior to the adiabatic expansion. P1 is the pressure after the adiabatic expansion, and Ps is the initial pressure prior to the adiabatic expansion. γ is the ratio of specific heats (1.4). For example, when Ts=300K, P1=1 atmosphere, and Ps=350 atmospheres, then in theory, T1 drops to approximately 56K (−217° C.).

Given the formula above, the temperature of the hydrogen after the reduction is pressure is dependent on the pressure Ps in the hydrogen tank 350; however, when setting the threshold X this temperature can be treated as a constant, independent of the pressure Ps, and thus the temperature of the hydrogen that is expelled can be handled as a constant. This constant value can be set based on, for example, the adiabatic expansion from the maximum pressure in order to set the constant value on the safe side from the perspective of preventing the temperature from dropping too far. Because the drop in temperature of the hydrogen tank 350 due to the expelled hydrogen depends on the amount of flow, the maximum discharge flow must be assumed when setting the threshold value X. Under these conditions, the amount of hydrogen discharge Y (Pa/° C.) required to drop the temperature of the hydrogen tank 350 by 1° C. can be established experimentally or analytically. The use of pressure in the units for the amount of discharge Y is because the amount of discharge of hydrogen is proportional to the change in pressure in the hydrogen tank 350.

The amount of discharge Y, described above, can be used in calculating the amount of discharge (Pa) of hydrogen required to drop the temperature of the hydrogen tank 350 from the initial temperature, or in other words, from the target temperature Th controlled by the heater, to the threshold value Ta. In the present form of embodiment, the amount of discharge is used as the threshold value X. In other words, X is set by "X (Pa)=(Th−Ta) (° C.)×Y (Pa/° C.)." This value is the value that is set at the beginning of use of the hydrogen tank 350 as the supply source, assuming that the initial target temperature Th, explained in the heater heating procedure (FIG. 14) has been achieved. When a temperature sensor is provided, the actual value for the initial temperature may be used. Although the threshold value X is shown as a condition based on the change in pressure in the hydrogen tank 350 in the formula above, in practice the condition can be based on the amount of hydrogen discharged from the hydrogen tank 350. Moreover, the threshold value X is set assuming the condition of the most severe drop in temperature, making it possible to prevent, with greater certainty, too large a drop in the temperature of the hydrogen tank 350.

As has already been explained, the temperature of the hydrogen that is discharged varies depending on the pressure P in the hydrogen tank 350, and thus the amount of discharge Y (Pa/° C.) of hydrogen required to drop the temperature of the hydrogen tank 350 by 1° C. is also dependent on the pressure P. When one considers the effect of this, the value of the aforementioned amount of discharge Y may be set based on a map or coefficient prepared in advance depending on the initial pressure Pini of the current tank.

In Step S332A, if it is determined that the current should be switched, the control unit 340 closes the valve 351 of the current tank (Step S333A). After this, the hydrogen tank 350 to become the supply source is selected from the hydrogen tanks 350, excluding the current tank, based on the two criteria of a) the amount of remaining hydrogen and b) a preexisting sequence. In the modified embodiment the temperature sensors are omitted, and thus criteria pertaining to temperature are not applicable.

As explained above, in this modified embodiment the temperature sensors are omitted, which is able to simplify the structure while still preventing too great a drop in temperature of the hydrogen tanks 350, in the same manner as in the embodiment.

The first modified embodiment can be applied also to systems wherein both the temperature sensors and the heating by heaters are omitted. In such a case, control is performed assuming that the hydrogen tank 350, for which the temperature has dropped because of the expulsion of hydrogen corresponding to the threshold value X (Pa) returns to the initial temperature T0 through natural heating through reducing the supply of hydrogen when hydrogen is supplied from another hydrogen tank 350. The threshold value X may be set, as already described above, by "X (Pa)=(T0 −Ta) (° C.)×Y (Pa/° C.)". In this system configuration, the increase in temperature dTr due to natural heating, from the temperature Ta must be greater than the drop in temperature dT due to adiabatic expansion (=T0 −Ta) for the hydrogen tank 350, or in other words, it is necessary for dTr>dT. Consequently, the number of hydrogen tanks 350 should be set so as to insure that the interval fulfills these requirements, or in other words, so that the period of time over which the supply of hydrogen from each individual hydrogen tank 350 is stopped fulfills these requirements. In order to reduce the time required to achieve the increase in temperature dTr, materials or structures that increase the absorbance of heat may be used in the regulator 355 equipped in the hydrogen tank 350.

Figure 16:
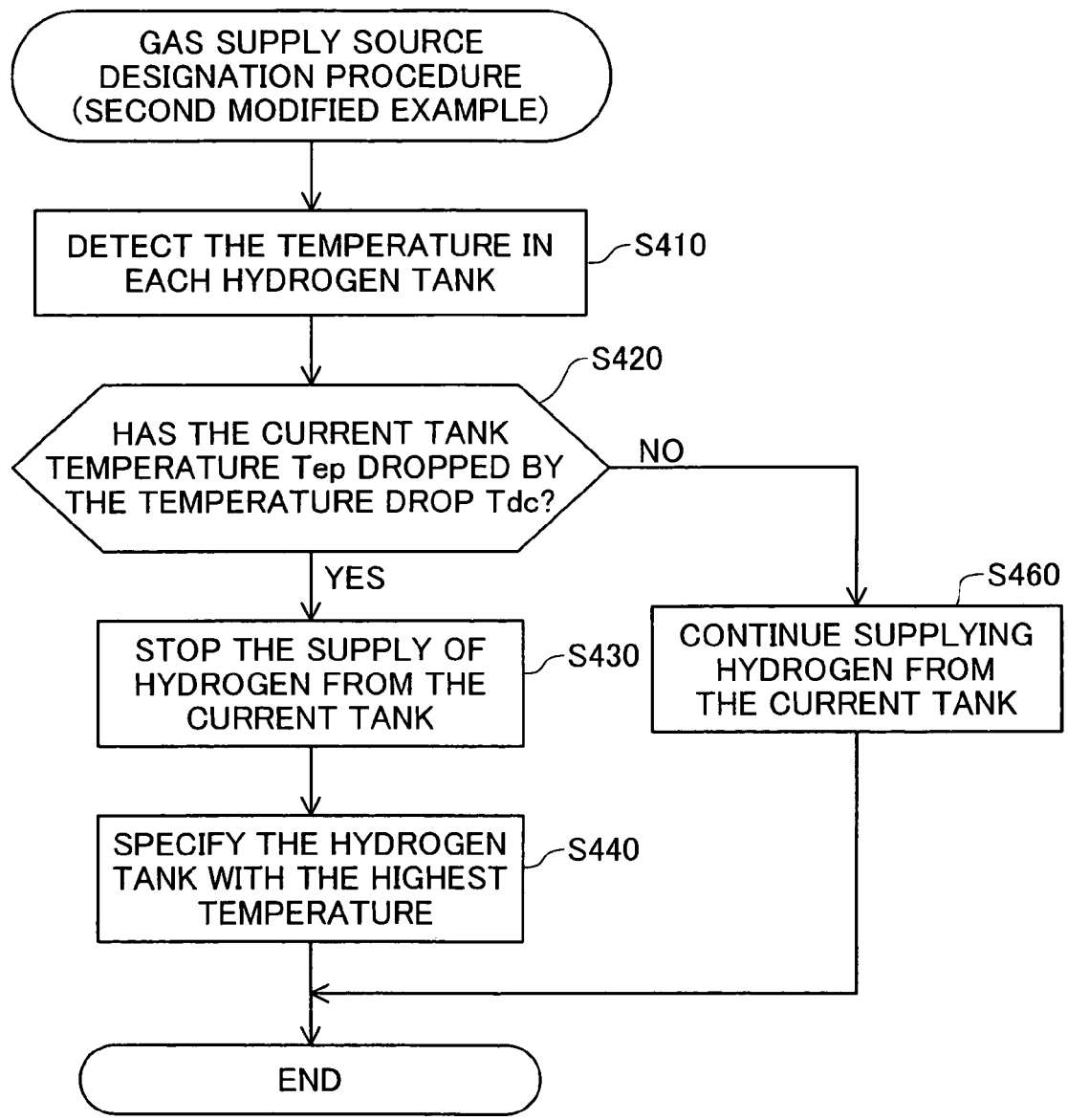
FIG. 16 is a flow chart illustrating a second modified embodiment of a procedure for gas supply source designation.

FIG. 16 is a flow chart showing a second modified embodiment of a gas supply source designation procedure. The gas supply source designation procedure shown in FIG. 16 is a procedure corresponding to Step S330 in the gas supply control (FIG. 10), described above. In the second modified embodiment, the supply source tank is selected so as to minimize the temperature differences between each of the hydrogen tanks 350, according to the temperatures of each of the hydrogen tanks 350.

When the gas supply source designation procedure shown in FIG. 16 is started, the control unit 340 detects each hydrogen tank temperature T (N) (where N=1 through 4) for the hydrogen tanks 350 (1) through 350 (4) (Step S410). Thereafter the control unit 340 checks whether or not the current tank temperature, which is the temperature, of the hydrogen tank temperatures T (N), that is the temperature of the current tank, which is the hydrogen tanks 350 that is the current supply source, has dropped by a temperature drop Tdc from the temperature at the time at which the current tank was switched to be the supply source (Step S420). Here the temperature drop Tdc is a specific temperature that is set in order to minimize the temperature difference between the individual hydrogen tanks 350, and in the present embodiment is set in advance to 5° C.

If the current tank temperature Tep has not dropped by the temperature drop Tdc (Step S420), then hydrogen supply from the current tank is continued (Step S460), and the gas supply source designation procedure is terminated.

On the other hand, if the current tank temperature Tep has dropped by the temperature drop Tdc (Step S420), then hydrogen supply from the current tank is stopped (Step S430), and the hydrogen tank 350 that has the highest temperature of the hydrogen tanks 350 (1) through 350 (4) is designated as the supply source tank, the supply source tank is switched (Step S440), and the gas supply source designation procedure is terminated.

In the second modified embodiment, the temperatures of the plurality of hydrogen tanks 350 are equalized, making it possible to control the damage due to the drop in temperature accompanying the gas supply.

Note that the temperature drop Tdc is not limited to being 5° C., but rather can be set to a specific temperature depending on system characteristics, environment of use, amount of hydrogen supply, and so forth. Moreover, the temperature drop Tdc needed not be a constant value for a specific temperature drop, but rather may be changed as appropriate during system operation according to system conditions. For example, the value of the temperature drop Tdc may be increased, at higher tank temperatures. Doing so makes it possible to reduce the frequency with which tanks are switched at high temperatures, where there is a relatively low possibility of damage to the components on the tanks. Moreover, rather than performing the supply source tank switch when there has been a specific drop in temperature from the point in time at which the current tank was set to be the supply source tank, the temperature differences between the individual hydrogen tanks 350 may be reduced through switching the supply source tank when the temperature difference of the current tank from the average temperature of the other hydrogen tanks 350, or when a specific amount of time has elapsed after the supply source tank has been switched. Moreover, along with equalizing the temperatures of the hydrogen tanks 350, the supply of hydrogen may be performed in the range of the guaranteed temperature range of the hydrogen tanks 350.

FIG. 17 is a flow chart showing a third modified embodiment of a gas supply source designation procedure. The gas supply source designation procedure shown in FIG. 17 is a procedure corresponding to Step S330 of the gas supply control (FIG. 10), explained above. In the third modified embodiment, the supply source tank is selected so as to reduce the temperature differences and pressure differences between the individual hydrogen tanks 350 based on the temperatures and pressures of the individual hydrogen tanks 350.

When the gas supply source designation procedure shown in FIG. 17 is started, the control unit 340 detects the various hydrogen tank temperatures T (N) (where N=1 through 4) and the various hydrogen tank pressures P (N) (where N=1 through 4) for the hydrogen tanks 350 (1) through 350 (4) (Step S510). Following this, the tank 350 with the minimum value for the supply source designation value F, as expressed by the following formula, is designated as the supply source tank, the supply source tank is switched (Step S520), and the gas supply source designation procedure is terminated.

$$F = \Sigma A \cdot (T(N) - Tave)^2 + \Sigma B \cdot (P(N) - Pave)^2 \quad (5)$$

Here A is the coefficient related to the hydrogen tank temperature T (N). B is the coefficient related to the hydrogen tank pressure P (N). The A and B are set to specific values suited to reduce the temperature differences and pressure differences between the various hydrogen tanks 350. Tave is the average temperature for all of the hydrogen tanks 350. Pave is the average pressure for all of the hydrogen tanks 350.

The third modified form is able to control the drop in use frequency of those hydrogen tanks 350 that, among the plurality of hydrogen tanks 350, have the tendency to be at lower temperatures due to the installation environment (for example, due to the state of exposure to sunlight, positioning relative to heat-producing equipment, etc.). Moreover, when each of the hydrogen tanks 350 have the same capacity, this third modified embodiment is able to equalize the gas density within the various hydrogen tanks 350.

Note that in Equation (5), which expresses the supply source designation value F, it possible to prevent excessive switching of the hydrogen tanks 350 by:

setting "A=0" when the absolute value of "(T(N)−Tave)<C (where C is a specific threshold value)"; and setting "B=0" when the absolute value of "(T(N)−Tave)<D (where D is a specific threshold value)".

Moreover, along with equalizing the temperatures and pressures of the hydrogen tanks 350, the hydrogen supply may be performed in the range of the guaranteed temperature range of the hydrogen tanks 350. In such case, the amount of gas that can be supplied without too great a drop in temperature may be calculated taking into account the temperature of the external atmosphere around the hydrogen tanks 350 and the temperatures of the hydrogen tanks 350 when switching the supply source tanks at a temperature immediately prior to the lower limit temperature of the guaranteed temperature range, to limit the supply of gas after the calculated amount of gas has been discharged.

B-(6). Other Forms of Embodiment:

Processing may be performed combining the second embodiment and the gas supply source designation processes in the modified embodiments (FIG. 11 and FIG. 15). In other words, when changing the current tank, the decision based on the temperature T of the hydrogen tank (Step S332 in FIG. 11) and the decision based on the change in temperature dP (Step S332A in FIG. 15) may be used in parallel. In such case, a method may be used wherein it is decided that the current tank should be switched when either commission is the field. Doing so makes it possible to prevent the possibility of an incorrect decision regarding switching.

While the above was explained for the second embodiment according to the invention, the invention is not limited to these embodiments, but rather, of course, may be applied to a variety of configurations without deviating from the intent thereof. For example, the invention can be configured as a system by which to provide gas to a stationary fuel cell, rather than just a fuel cell mounted on a vehicle. Moreover, the invention can be applied to gas supply apparatus for supplying a variety of gases at reduced pressures from a plurality of high-pressure tanks, rather than being limited to hydrogen alone. While the embodiments and modified embodiments illustrated cases wherein a single hydrogen tank 350 was selected as the supply source, instead a plurality of hydrogen tanks 350 may be selected simultaneously.

Moreover, while in the embodiments the hydrogen tanks 350 were heated by a heater 352, instead the hydrogen tanks 350 may be heated through the use of waste heat from a heat-producing unit such as the fuel cell 320 or the inverter 331. Moreover, a refrigerant may be circulated between the surfaces of each of the hydrogen tanks 350 and the heat-producing unit to perform the exchange of heat between the heat-producing unit and each of the hydrogen tanks 350. Furthermore, the exchange of heat may be performed between the various hydrogen tanks 350 by circulating a refrigerant between the various hydrogen tanks 350.

INDUSTRIAL APPLICABILITY

The invention may be applied to gas supply apparatus for supplying, to the outside, gas that is stored in the tank. Moreover, the invention may be used not only in gas supply apparatus for handling hydrogen, but also in gas supply apparatus for handling a variety of gases such as oxygen, nitrogen, and air.

What is claimed is:

1. A gas supply apparatus comprising:
   a tank unit that includes a plurality of tanks storing a gas and a discharge mechanism discharging the stored gas to the outside of the tanks at a reduced pressure of the stored gas;
   a temperature detector that detects a temperature of each of the plurality of tanks; and
   a supply regulator that regulates supply of the gas from the tank unit according to the detected tank temperature of each of the plurality of tanks, wherein:
   the supply regulator regulates the gas supply according to the detected tank temperatures so as to reduce a temperature difference between the plurality of tanks by switching a supply source of the gas from an in-use tank to another tank among the plurality of tanks.

2. The gas supply apparatus according to claim 1, wherein the supply regulator regulates the gas supply so as to reduce the temperature difference between the plurality of tanks, by switching a supply source of the gas from an in-use tank and to another tank among the plurality of tanks when the tank temperature of the in-use tank drops by a prescribed temperature after the in-use tank is activated as the supply source.

3. The gas supply apparatus according to claim 1, wherein the supply regulator regulates the gas supply so as to reduce the temperature difference between the plurality of tanks, by switching a supply source of the gas from an in-use tank and to another tank among the plurality of tanks when a temperature difference between the in-use tank and the another tank becomes a prescribed temperature difference.

4. The gas supply apparatus according to claim 2, wherein the tank activated as the supply source by the supply regulator is a tank having the highest temperature among the plurality of tanks.

5. The gas supply apparatus according to claim 1, the gas supply apparatus further comprising a pressure detector that detects each pressure of the plurality of tanks,
wherein the supply regulator regulates the gas supply according to the detected tank pressures and the detected tank temperatures so as to reduce a pressure difference and the temperature difference between the plurality of tanks.

6. The gas supply apparatus according to claim 1, wherein the supply regulator regulates the gas supply from the tank based on a relationship between the detected tank temperature and a range of guaranteed temperatures where performance of the tank is guaranteed.

7. The gas supply apparatus according to claim 6, wherein the supply regulator regulates the gas supply from the tank so that the detected tank temperature keeps in the range of guaranteed temperature where the performance of the tank is guaranteed.

8. The gas supply apparatus according to claim 6, wherein:
the tank unit includes a plurality of the tanks;
the temperature detector detects at least a temperature of a tank working to supply the gas as a source tank among the plurality of tanks; and
the supply regulator regulates the gas supply from the source tank based on the relationship between the detected temperature of the source tank and the range of guaranteed temperature where the performance of the source tank is guaranteed.

9. The gas supply apparatus according to claim 8, wherein the supply regulator regulates the gas supply from the source tank so that the detected temperature of the source tank keeps in the range of guaranteed temperature where the performance of the source tank is guaranteed.

10. The gas supply apparatus according to claim 8, wherein the supply regulator regulates the gas supply from the source tank when the detected temperature of the source tank drops by a prescribed temperature within the range of guaranteed temperature after the tank is activated as source tank.

11. The gas supply apparatus according to claim 8, wherein: the temperature detector detects the each temperature of the plurality of tanks; and
the supply regulator regulates the gas supply from the source tank when a temperature difference between the source tank and another tank among the plurality of tanks becomes a prescribed temperature difference within the range of guaranteed temperature.

12. The gas supply apparatus according to claim 11, the gas supply apparatus further comprising a pressure detector that detects each pressures of the plurality of tanks,
wherein the supply regulator regulates the gas supply from the source tank when the prescribed temperature difference occurs or when a pressure difference between the source tank and the another tank among the plurality of tanks becomes a prescribed pressure difference.

13. The gas supply apparatus according to claim 8, wherein the supply regulator comprises a tank selector that, when the gas supply is regulated, selects a tank to become the source tank from among other tanks which are different from the initial source tank.

14. The gas supply apparatus according to claim 13, wherein the tank selector selects a single one of the plurality of tanks at any given time as the source tank.

15. The gas supply apparatus according to claim 13, wherein the tank selector selects the tank to become the source tank based on a record of using the plurality of tanks as the source tank.

16. The gas supply apparatus according to claim 13, wherein:
the temperature detector detects the each temperature of the plurality of tanks; and
the tank selector selects the tank to become the source tank based on the detected tank temperatures.

17. The gas supply apparatus according to claim 8,
wherein the supply regulator comprises:
a defect checker that detects a defect in the gas supply from the source tank; and
a defect selector that selects that, when the defect in the gas supply from the source tank is detected, selects the tank to become the source tank from among other tanks which are different from the initial source tank.

18. The gas supply apparatus according to claim 8,
the gas supply apparatus further comprising:
a supply pipe that connects in common to the each discharge mechanism of the plurality of tanks so as to supply the gas;
a supply pipe pressure detector that detects a pressure within the supply pipe; and
a supply pipe checker that checks a status of at least one of the discharge mechanisms, based on behavior of the detected pressure within the supply pipe when the gas supply is started.

19. The gas supply apparatus according to claim 1, wherein the temperature detector detects the tank temperature based on physical quantity related to the gas supplied from the tank.

20. The gas supply apparatus according to claim 1, wherein the temperature detector detects the tank temperature based on degree of adiabatic expansion of the gas supplied from the tank.

21. The gas supply apparatus according to claim 1, wherein the temperature detector detects the tank temperature based on heat quantity removed from the tank by the gas supplied from the tank.

22. The gas supply apparatus according to claim 1, wherein the temperature detector detects a temperature of at least a part of the tank and the discharge mechanism as the tank temperature.

23. The gas supply apparatus according to claim 1, wherein the temperature detector detects the tank temperature based on supply quantity of the gas supplied from the tank.

24. The gas supply apparatus according to claim 1, the gas supply apparatus further comprising a heater that heats the tank.

25. The gas supply apparatus according to claim 1, the gas supply apparatus further comprising a warning part that, when an abnormality in the gas supply from the tank occurs, warns of the abnormality.

26. The gas supply apparatus according to claim 1, wherein the gas is a fuel gas, including hydrogen, used in a fuel cell that is a supply destination of the gas.

27. A method of controlling a gas supply apparatus that comprises a tank unit including a plurality of tanks storing a gas and a discharge mechanism discharging the stored gas to the outside of the tank at a reduced pressure of the stored gas so as to supply the gas to the outside,
the method comprising:
detecting a temperature of each of the plurality of tanks; and
regulating supply of the gas from the plurality of tanks based on a relationship between the detected temperature of the tanks and a range of guaranteed temperature where performance of the tank is guaranteed and so as to reduce a temperature difference between the plurality of tanks by switching a supply source of the gas from an in-use tank to another tank among the plurality of tanks.

28. A method of controlling a gas supply apparatus that comprises a tank unit including a plurality of tanks storing a gas and a discharge mechanism discharging the stored gas to the outside of the tank at a reduced pressure of the stored gas so as to supply the gas to the outside, the method comprising:

detecting at least a temperature of one of the plurality of tanks working to supply the gas as a source tank among the plurality of tanks; and regulating supply of the gas from the source tank based on a relationship between the detected temperature of the source tank and a range of guaranteed temperature where performance of the source tank is guaranteed and so as to reduce a temperature difference between the plurality of tanks by switching a supply source of the gas from an in-use tank to another tank among the plurality of tanks.

29. The gas supply apparatus according to claim 1, wherein the supply regulator controls the discharge mechanism according to the detected tank temperature.

30. The gas supply apparatus according to claim 1, wherein the discharge mechanism is a valve, disposed in a piping connecting from the tank to the outside, for controlling a flow of the gas within the piping.

31. The gas supply apparatus according to claim 1, wherein the supply regulator reduces supply quantity of the gas supplied from the tank through controlling the discharge mechanism according to reduction in the detected tank temperature.

32. The gas supply apparatus according to claim 1, wherein the supply regulator varies supply quantity of the gas supplied from the tank through controlling the discharge mechanism according to the detected tank temperature.

33. The gas supply apparatus according to claim 1, wherein the gas is stored in the tank in a gaseous state.

* * * * *